(12) United States Patent
Okuno

(10) Patent No.: US 7,440,457 B2
(45) Date of Patent: Oct. 21, 2008

(54) NETWORK-PROCESSOR ACCELERATOR

(75) Inventor: Michitaka Okuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 737 days.

(21) Appl. No.: 10/956,089

(22) Filed: Oct. 4, 2004

(65) Prior Publication Data
US 2005/0074005 A1 Apr. 7, 2005

(30) Foreign Application Priority Data
Oct. 6, 2003 (JP) .............................. 2003-346519

(51) Int. Cl.
*H04L 12/28* (2006.01)
(52) U.S. Cl. .................... 370/392; 370/412; 370/474
(58) Field of Classification Search .................. None
See application file for complete search history.

(56) References Cited
U.S. PATENT DOCUMENTS

| | | | |
|---|---|---|---|
| 5,434,863 A | 7/1995 | Onishi et al. | |
| 6,768,739 B1 * | 7/2004 | Kobayashi et al. | 370/392 |
| 7,120,152 B2 * | 10/2006 | Park | 370/395.32 |
| 2002/0126680 A1 | 9/2002 | Inagaki et al. | |
| 2002/0150088 A1 | 10/2002 | Yoshino et al. | |
| 2003/0118020 A1 * | 6/2003 | Calle et al. | 370/392 |

FOREIGN PATENT DOCUMENTS

JP 2004-260532 2/2003

* cited by examiner

*Primary Examiner*—Edan Orgad
*Assistant Examiner*—Jung Park
(74) *Attorney, Agent, or Firm*—Reed Smith LLP; Stanley P. Fischer, Esq.; Juan Carlos A. Marquez, Esq.

(57) ABSTRACT

In order to perform cache processing for the received packets, a network apparatus is provided with a network-processor accelerator for caching the process result of a network processor. Accordingly, the network apparatus of the present invention ensuring higher packet-processing throughput can be realized by improving the packet-processing throughput without increase in the chip area, increase in the power consumption, and shortage in an external connected memory bandwidth.

25 Claims, 16 Drawing Sheets

NETWORK-PROCESSOR ACCELERATOR

CLAIM OF PRIORITY

The present application claims priority from Japanese application JP 2003-346519 filed on Oct. 6, 2003, the content of which is hereby incorporated by reference into this application.

FIELD OF THE INVENTION

The present invention relates to a technology relates to a method of constituting a network apparatus such as a router and a switch intended to a low delay switching system for large capacity packets and a technology regarding packet processing system of a network processor for implementing the requested processes of packets within the network apparatus. Moreover, the present invention relates to a technology which can be adapted effectively to the process of IP (Internet Protocol) packet and MAC (Media Access Control) frame in the network apparatus.

BACKGROUND OF THE INVENTION

In the field of telecommunication, a network apparatus such as router or switch is used for connecting a plurality of networks. The network apparatus is used determines a transfer destination of packets by searching a destination address of the packets received and then transfers these packets to the predetermined transfer destination. A total amount of packets transmitted or received by the networks in the world is more and more increasing and packet transfer performance of network apparatus is therefore required to increase in accordance with increase in amount of traffics.

FIG. 2 illustrates an example of structure of the network apparatus in the prior art. In FIG. 2, an network apparatus is provided with an input network interface unit 12, an input network processor 15, a table memory for input network processor 16, an input switch fabric interface unit 14, a switch fabric unit 40, an output network interface unit 22, an output network processor 25, a table memory for output network processor, and an output switch fabric interface unit 24 or the like. Here, a network processor is a special processor for the network apparatus which is particularly designed for packet transfer process.

The input network interface unit 12 receives packets from the network and processes the received packets in the input network processor 15. The network processor 15 refers to a routing table in the table memory 16 and transfers packets to an adequate port of the switch fabric unit 40 from the input switch fabric interface unit 14 on the basis of the result of search. The output switch fabric interface unit 24 having received packets from the switch fabric 40 executes necessary packet process such as QoS (Quality Of Service) control in the output network processor 25 and transmits packets to the network from the output network interface unit 22.

For determination of transfer destination of packets, it is essential to look up a routing table stored in the table memory. In general, a routing table is huge and the lookup process of the routing table is considered as a bottle-neck process for the transfer of packets in the network apparatus. Accordingly, various technologies have been developed to realize high-throughput operation of the network processor thereof, for example, multithread architecture, VLIW (Very Large Instruction Word) architecture, and so on are used for parallel packet processing. Also multiprocessor architecture is used in order to hide long memory access latency.

Meanwhile, a technology for realizing high-throughput operation of a network processor using an accelerator has also been developed. For example, a technology for realizing high-throughput routing process by assisting a main processor has been disclosed in the JP-A No. 199230/1993 (U.S. Pat. No. 5,434,863) and JP-A No. 86149/2001. Moreover, a technology for realizing indirect high-throughput routing table lookup by alleviating a load of the main processor through the processor operations other than the routing table lookup (for example, IPsec, VPN, NAT, illegal attacking packets detection, etc.) using an accelerator has been disclosed in the JP-A Nos. 271363/2002 and 281072/2002.

[Patent Document 1] JP-A No. 199230/1994
[Patent Document 2] JP-A No. 086149/2001
[Patent Document 3] JP-A No. 271363/2002
[Patent Document 4] JP-A No. 281072/2002
[Patent Document 5] JP-A No. 048730/2003

In a method in the prior art for realizing high-throughput packet process of a network apparatus through high-throughput operation of a network processor thereof, development of the network apparatus corresponding to increase in the present traffics is difficult. The reason is that realization of high-throughput network processor will bring about remarkable increase in size of the network processor and also generation of problems such as increase in power consumption and defective operation due to radiation of heat.

SUMMARY OF THE INVENTION

Therefore, a first object of the present invention is to provide a novel packet processing technology which can improve packet-processing throughput without enlargement in size of a processor.

Moreover, a second object of the present invention is to give a solution to at least any of the problems additionally generated due to such relevant new packet processing technology.

For realization of high-throughput packet transfer process by avoiding enlargement in size of network processor, it is useful to introduce a technology called process cache. According to this technology, a cache is provided to the network processor to record the results of processes for the received packets. Moreover, in this process-cache technology, only the packets processed for the first time in the network processor are processed in the processors built into the network processor, the results of processes are recorded, and the results recorded in the process cache are thereafter adapted to the received packets considered as the equivalent ones. Accordingly, the number of processes in the integrated processors comprised in the network processor can be reduced and thereby packet-processing throughput of the network processor can be improved.

Meanwhile, following problems are assumed to additionally occur through employment of the architecture called the process cache.

1) The network processor employing process-cache architecture executes, with the integrated processors, packet processes which are considered to be difficult in improvement of processing throughput and also executes, with logic in the latter stage in the network processor, the remaining processes which are considered to be easier in improvement of processing throughput. Packet transfer process in the network apparatus is sorted to the process which requires high-level program process accompanied by reference to external memory, namely the process resulting in a large share to the network processor and the process resulting in a small share to the network processor. The processes resulting in large share include routing table lookup, address translation table lookup, and protocol process or the like. The processes resulting in small share include bit manipulation process or the like such as addition, deletion, replacement, and modification of header information.

When the packet in which a result of process is once recorded to cache is identical to that of destination address, the high-throughput process based only on the bit manipulation using contents of registration is possible, but a part, which is difficult in improvement of processing throughput, of the packet not yet recorded must be processed with the integrated processors. Therefore, in the case where the situation, in which a large amount of unrecorded packets are coming from time to time, is often generated, the integrated processors become short in the number, resulting in the overflow of processes.

2) In the integrated processors of the network processor, one or more packets, which will bring about the identical results, are likely to arrive during the period until the time when unrecorded packets are recorded to the cache for recording results of process from the time when process of the packets not yet recorded to the cache for recording result of process is started. In this case, since all arriving packets are not yet recorded to the cache for recording result of process, the recorded data of the cache for recording result of process cannot be used.

In order to solve the problems described in the item 1), a network processor including process cache is divided into the following two parts, and both parts are combined through an interface. The first part consists of the process cache and a part for high-throughput execution, and this first part is called a network-processor accelerator. The second part is processors that execute complex processing. For this second processing part, conventional network processors or general purpose processors are used. The network-processor accelerator can improve the processing throughput of the complex processing part by replacing the external processors part with higher processing throughput processors part.

In order to solve the problems described in item 2), a cache-miss handler is provided to form a network apparatus or a network-processor accelerator so that packet transfer can be realized without transfer of packets to the network processor even if a cache miss is generated. In more practical, a means for management of packets which are now under the request of process to an external network processor and a means for management of received packets, through discrimination from the packets which have generated cache miss, which are expected in the result of process to become identical to that of packets which are now under the request of process are provided. Moreover, for the packets which are already requested for process to the network processor, the received packets are processed upon reception of a response from the network processor. Accordingly, the packets which have generated a cache miss can be processed without issuance of a further request of process to the network processor.

A network apparatus which assures higher packet-processing throughput can be realized by using the network-processor accelerator of the present invention as a packet process unit of the network apparatus.

DETAILED DESCRIPTION OF THE PREFERRED EMBODIMENTS

More detail contents of the present invention will be described below on the basis of the preferred embodiments thereof.

First Embodiment

Figure 1:
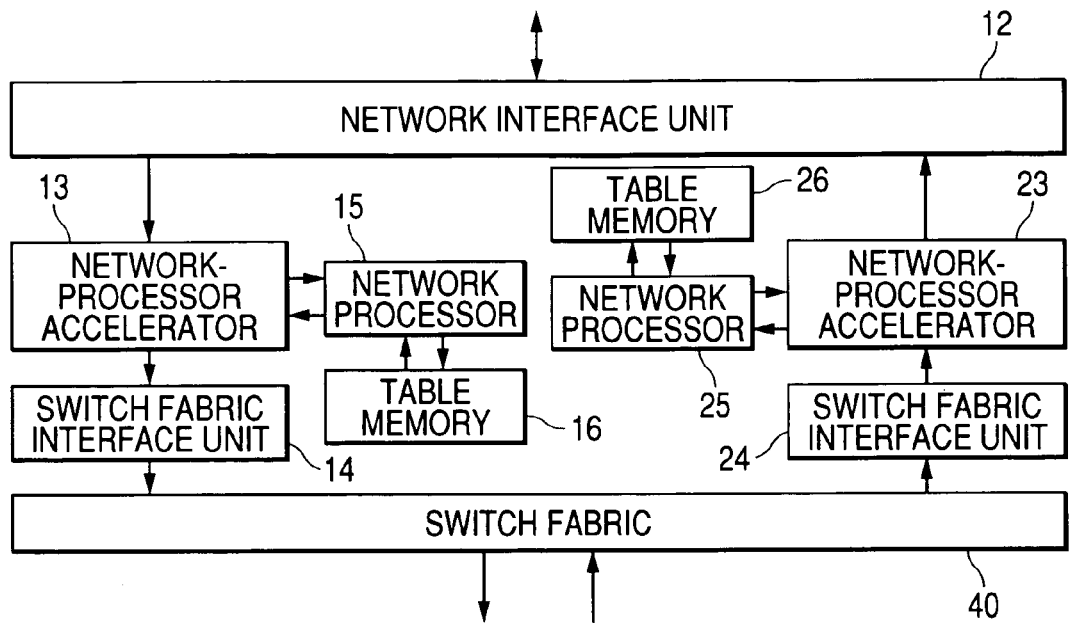
FIG. 1 is a block diagram of a network apparatus as a first embodiment of the present invention that has been constituted using a network-processor accelerator and an external network processor.

FIG. 1 illustrates an example of constitution of a network apparatus of this embodiment.

A network apparatus is constituted with a network interface unit 12, an input switch fabric interface unit 14 for transmitting packets to a switch fabric or the like, a switch fabric 40 for exchanging the packets, an output switch fabric interface 24 for receiving packets from the switch fabric or the like, a network-processor accelerator 13 for executing packet processes in the input side, a network processor 15, a table memory 16 to be referred from the network processor 15, a network-processor accelerator 23 for executing packet processes in the output side, a network processor 25, and a table memory to be referred from the network processor 25 or the like. In addition, an interface to a host processor or the like is also provided to execute the processes in accordance with the requests from the network processor and network-processor accelerator.

Next, the basic packet processing operations in the network apparatus illustrated in FIG. 1 will be described. First, the network interface unit 12 of the network apparatus receives optical signals or electrical signals from the network and transfers these signals through translation into frames of data link layer as layer 2 and packets of network layer as layer 3 supported by a network-processor accelerator 13. In FIG. 1, only one network is illustrated but a plurality of networks may be connected to only one network interface unit 12.

The packets having arrived at the network-processor accelerator 13 require high-level program processes accompanied by reference to outer memory in which improvement in the processing throughput is comparatively difficult, for example, routing table lookup, address translation lookup, and protocol process or the like and also simultaneously require bit manipulation, in which improvement in the processing throughput is comparatively difficult, for example, addition, deletion, replacement, and modification of the header information.

The network-processor accelerator 13 is provided with a process cache for recording results of processes of packets which are difficult in improvement of the processing throughput. The process cache consists of cache memory and has various means for making reference to cache memory. Details of the process cache will be described later. When the packets received from the network interface unit 12 are determined to be able to use the results of processes recorded in the process cache, remaining packet processes which can easily improve the processing throughput are executed only with the network-processor accelerator 13 and the packets are then transmitted to the input switch fabric interface unit 14. In view of avoiding deterioration in the packet-processing throughput due to influence in reference to an outer connection memory, the network-processor accelerator 13 includes a integrated packet memory to hold the received packets. However, as an option, it is also possible to introduce the means that is provided with an outer packet memory for realizing high-throughput transmission and reception of packets to and from the network-processor accelerator 13.

When the network-processor accelerator 13 receives, from the network interface unit 12, the packets in which the packet process results of the part which is difficult in improvement in the processing throughput is not yet recorded to the process cache, the accelerator 13 transfers such packets to the external connected network processor 15 in order to obtain the process results of packets in which improvement in the processing throughput is difficult described above. A format of packet transferred to the network processor 15 is identical to that in which an exclusive header which the network-processor accelerator 13 uses therein is added before the format which the network-processor accelerator 13 has received from the network interface unit 12. The exclusive header includes, for example, a serial number of packet for immediately determine the processing result of the packet when it is returned from the network processor 15 and a flag or the like showing contents of processes to be requested to the network processor 15.

Figure 2:
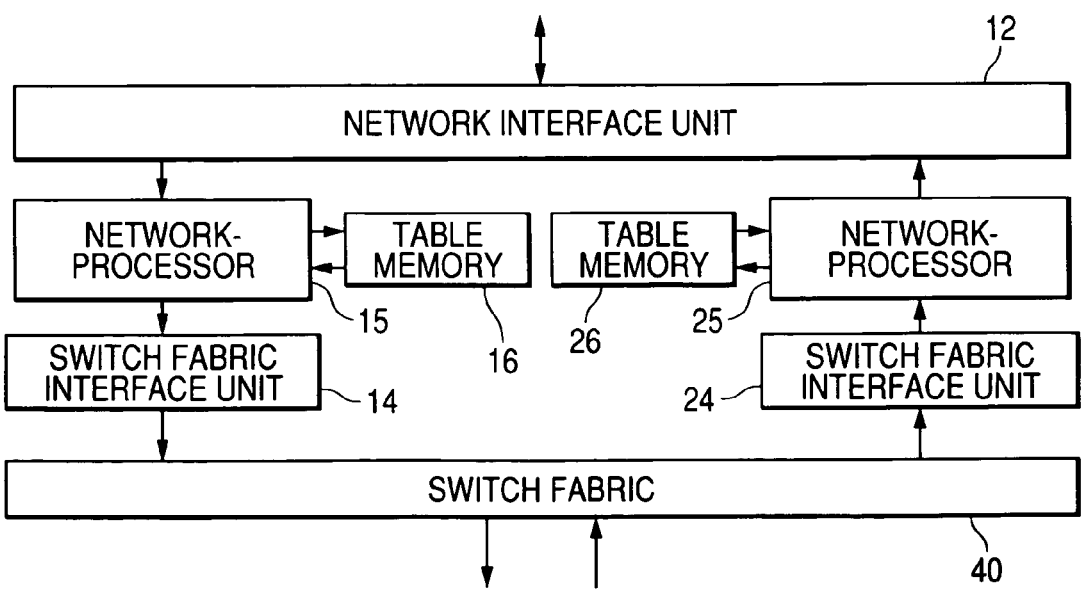
FIG. 2 is a block diagram of the network apparatus conventionally constituted using the network processor.

Moreover, when the number of wires of the interface unit for receiving packets of the network-processor accelerator is defined as NAin, the number of wires of the interface unit for receiving packets of the network processor as NPin, and the number of wires of the interface unit for transmitting packets of the network processor as NPout, both NPin and Npout depend on the network processor used. In general, the relationship of NPin=NPout is established. Moreover, in the constitution of this first embodiment, the network-processor accelerator is allocated at the position where the network processor is allocated in the case of the conventional constitution illustrated in FIG. 2. Therefore, it is essential to set up the relationship of NAin=NPin in order to keep compatibility in the number of wires to the constitution of the prior art. However, when the number of packets which the network processor receives is sufficiently smaller than the number of packets which the network-processor accelerator receives, it is possible to form the constitution to provide the result that the sum of NPin and NPout becomes about NAin. In other words, it is also possible to form the constitution by using the network-processor accelerator to provide the result that the sum of the number of input and output wires of the network processor is identical to that in the prior art and NAin becomes equal to two times in comparison with that of the prior art.

Moreover, when the bandwidth of the interface unit for receiving packets of the network-processor accelerator is defined as BWAin, the bandwidth of the interface unit for receiving packets of the network processor as BWPin, and the bandwidth of the interface unit for transmitting packets of the network processor as BWPout, both BWPin and BWPout depend on the network processor used. In general, the relationship of BWPin=BWPout is established. It is enough for the network-processor accelerator to have the bandwidth of BWPin<BWAin because the packets hitting the process cache are no longer required to sent a request of process to the network processor.

Upon reception of packets, the network processor 15 executes the processes of the part which is difficult in improvement in the processing throughput among the necessary processes. The necessary processes can be executed with a method of making reference to a header added by the network-processor accelerator 13 or with a method to be executed in accordance with a program of the network processor 15. In any method, the network processor 15 executes packet processes which are not executed in direct with the network-processor accelerator 13. The packet processes not executed in direct with the network-processor accelerator 13 include, for example, routing table lookup of packets with reference to the translation table stored in the table memory 16; translation to IPv6 (Internet Protocol Version 6) address from IPv4 (Internet Protocol Version 4) address; translation to IPv4 address from IPv6 address; translation to IPv4 address from IPv4 address; translation to the other IPv6 address from IPv6 address; addition, replacement, deletion or the like of label such as MPLS (Multi Protocol Label Switching) and VLAN (Virtual Local Area Network); and protocol process or the like such as RIP (Routing Information Protocol) and OSPF (Open Shortest Path First). Here, the memory for storing the translation table for various translation process described above is often provided with exclusive table memories for each translation table, for example, a table memory for routing table lookup and a table memory for translation to IPv4 address from IPv6 address. The packet processes of the part being left unprocessed in the network processor 15 after the protocol process and the other processes are processed with the host processor through the interface built in the network processor 15 such as the PCI interface or the like. Execution of the processes such as addition, deletion, replacement, and modification of header which can be improved easily in the packet-processing throughput as the functions of the network-processor accelerator 13 are not required here.

The network processor 15 is sometimes provided with an outer packet memory, as an option, when it is not provided with a integrated packet memory to hold the packets transmitted from the network-processor accelerator 13 or provide with a memory having only a small amount of capacity.

The network processor 15 transmits, after execution of the necessary packet processes, the exclusive header used by the network-processor accelerator 13 in addition to the results of processes to the network-processor accelerator 13. The exclusive header includes a serial number generated when the relevant packet is transferred from the network-processor accelerator 13 and a format of the results of process or the like. The format of the result of process is sorted to the entire part of the processed packets, only the header part among the processed packets, and the format itself recorded to the process cache. The desired format can be modified with a program of the network processor.

When the network-processor accelerator 13 receives the result of processes from the network processor 15, the accelerator 13 registers the result of processes to the process cache, adapts the result of processes to the relevant packets, and thereafter executes addition, deletion, replacement, and modification of header. Thereafter, the accelerator 13 adds the header for the switch fabric 40 to such result and then transmits the processed packets to the input switch fabric interface 14.

The input switch fabric interface unit 14 to the switch fabric 40 transmits the packets to the switch fabric 40 and completes the packet processes in the input side.

The switch fabric 40 is connected with a plurality of domains for processing packets in the input side from the network formed of the network-processor accelerator 13, network processor 15, table memory 16, and switch fabric interface unit 14 or the like. Moreover, the switch fabric 40 is connected with a plurality of domains for processing the output packets to the network in the equal number of domains for processing the input packets from the network. A domain for processing the output packets to the network is constituted with the network accelerator 23, network processor 25, table memory 26 and switch fabric interface unit 24 or the like. The switch fabric 40 refers to the header for switch fabric 40 added to the received packet and transfers the received packets to the output port of the relevant switch fabric 40.

In the output side of the network apparatus, packets are received with the output switch fabric interface unit 24 from the switch fabric 40.

The network apparatus executes, in the output side thereof, the processes similar to that in the input side thereof described above to the direction toward the network interface unit 12 from the switch fabric interface unit 24 and transmits the packets or frames the network through translation into an optical signal or electrical signal in the network interface unit 12.

Although not illustrated in the figures, the network-processor accelerator and network processor in this embodiment are respectively provided with wiring pins for mounting over the substrate and are connected with the other devices forming the network apparatus through the wires connected to the wiring pins. For example, when the network-processor accelerator 13 illustrated in FIG. 1 is mounted over the substrate, a plurality of wiring pins are added to the network-processor accelerator 13 and a part of a plurality of wiring pins is assigned to the network interface unit 12, input switch fabric interface unit 14, and network processor 15. This is also adapted to the output network processor 23 and the other devices.

Next, an example of inner constitution of a network-processor accelerator will be described in detail. Since the same network-processor accelerator may be utilized in both input and output sides, description will be made here with reference to the network-processor accelerator 13.

Figure 3:
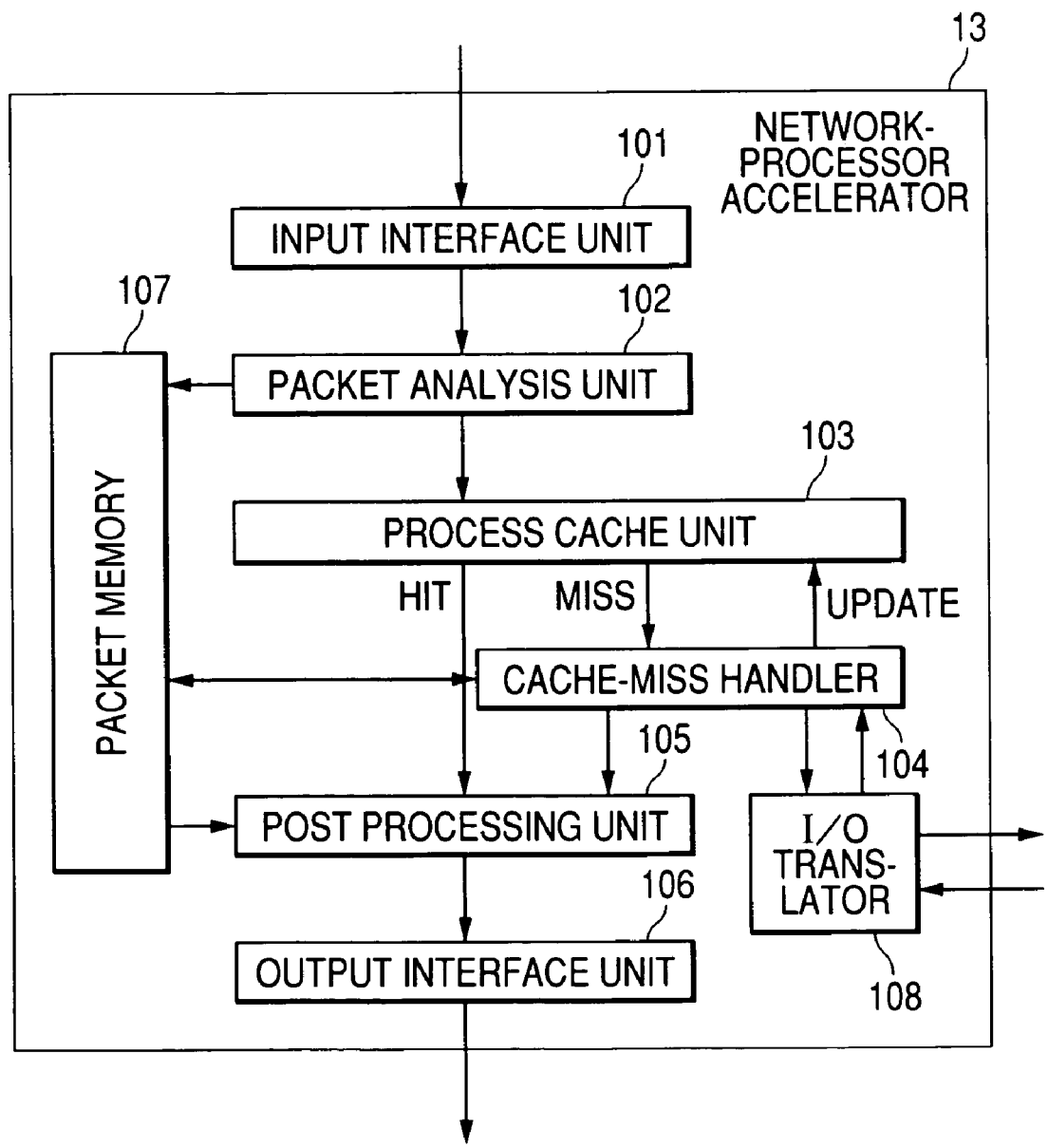
FIG. 3 is a block diagram of an inner constitution of the network-processor accelerator as the first embodiment of the fourth embodiment of the present invention.

FIG. 3 illustrates an example of the inner constitution of the network-processor accelerator 13 illustrated in FIG. 1. The network-processor accelerator 13 is constituted by an input interface unit 101 for receiving packets from the external circuits to translate these packets into the format to be processed therein, a packet memory 107 for holding the received packets, a packet analysis unit 102 for analyzing the received packets and extracting only the information required for internal process, a process-cache unit 103 for referring to the process cache on the basis of the extraction information generated by the packet analysis unit 102 and changing the process path of packets based on the results of reference, a cache-miss handler 104 for processing the packets not yet recorded to the process cache, a post-processing unit 105 for conducting addition, deletion, replacement, and modification of packet header and re-assembling of packet with the bit manipulation, an output interface unit 106 for outputting the processed packets to an external circuit of the network-processor accelerator 13, and an input-output translator 108 for translating an input and output format to and from the network processor connected to the external circuit or the like. The input-output translator 108 is also provided with the interface function for connection with an outer network processor. A merit of such interface function may be found in possibility of replacement of the connected network processor. Such merit can be covered by replacing the connected network processor with that assuring higher processing throughput in such a case, for example, that the situation in which packets not yet recorded to the process cache are coming from time to time in large amount is generated in higher frequency. As described above, mounting can be realized by using a part of the wiring pins added to a chip only for connection with the network processor.

Moreover, one network-processor accelerator may also be connected with a plurality of network processors through the interface. In this case, the interface is provided with the switch function for the switching of connection between one accelerator and a plurality of network processors. As a connection switching method, connections are sequentially switched for every reception of packets. In this case, it is required to provide a counter for counting up the packets. This method can provide a merit from the viewpoint of cost because it may be realized easily.

Otherwise, it is also possible that the switch is provided with the load balancing function. In this case, a merit that operation efficiency of a plurality of network processors connected can be attained. However, this method has a demerit from the viewpoint of cost because the function of interface is complicated.

Figure 4:
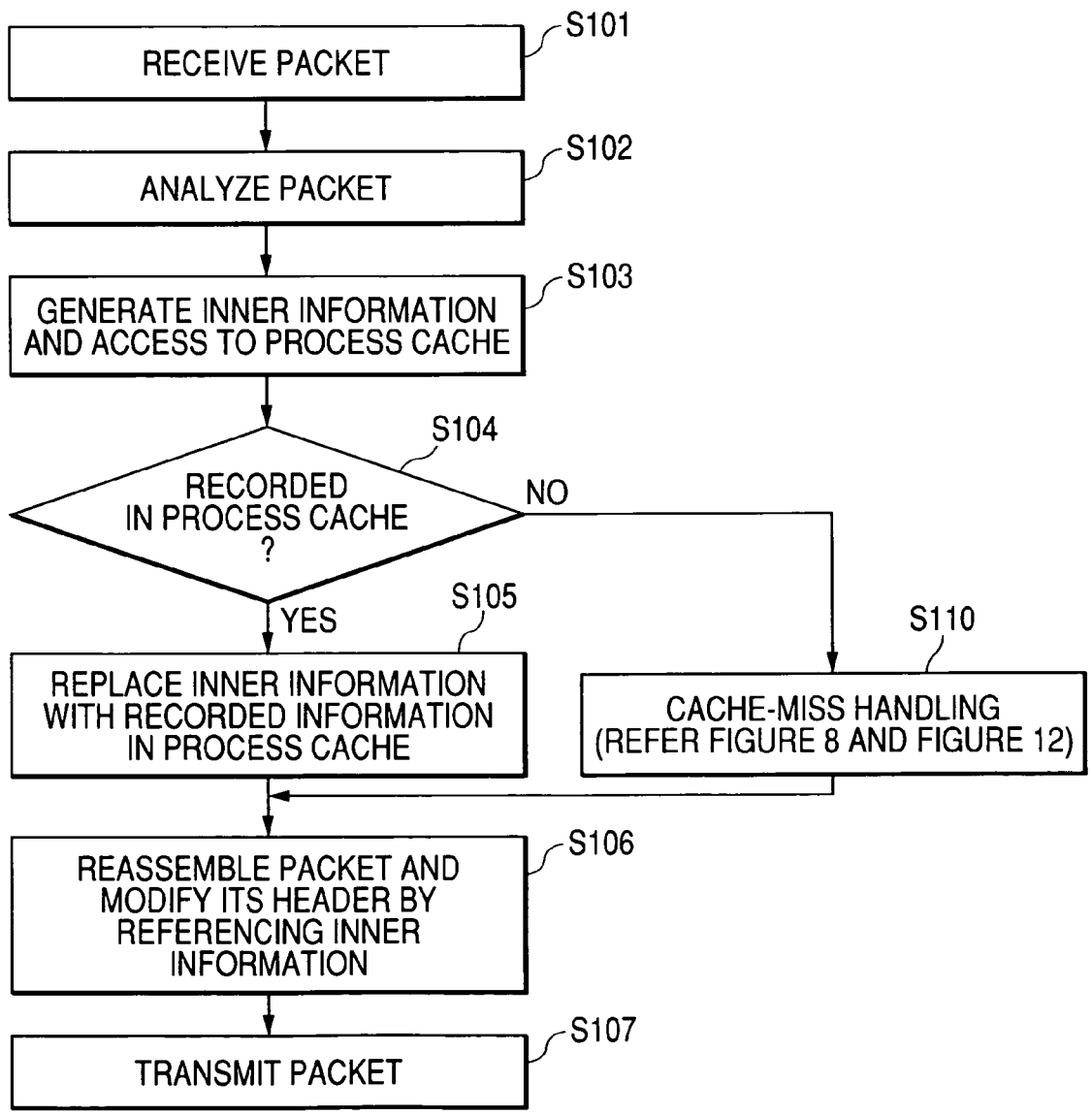
FIG. 4 is a flowchart of packet processes of the network-processor accelerator.

FIG. 4 illustrates a flowchart for operations of the network-processor accelerator 13 illustrated in FIG. 3.

First, packets are received in the format of layer 2 or 3 from an external circuit utilizing the input interface unit 101 and the format is then translated into that which can be processed within the network-processor accelerator (S101 (number on the flowchart of FIG. 4)).

Next, the received packets are held in the packet memory 107 of large capacity allocated over the same chip and these packets are scanned in the packet analysis unit 102 to sequentially identify the header information position up to the necessary layer from the layer 2 and extract the necessary domains (S102).

Such analysis and extraction can be conducted in higher operation rate, for example, with a method established by the combination of barrel shifter, mask logic, and comparator like the pipeline. Since various fields included in the header information of frame and packet are formed in the size of integer bytes, it is enough when shift and mask are implemented in the unit of bytes. For actual extraction, an extraction bus of about 32 bytes to 64 bytes is prepared, for example, this bus is provided with a plurality of sets of mask logic and barrel shifter and a comparator for determining the next extraction domain, and a latch for coupling the extraction information is provided in the final stage. When the barrel shifter set is formed through combination of the shift logics of 1, 2, 4, 8, 16, and 32 bytes, shift can be made freely within the 64 bytes. The mask logic is used for masking up to the particular byte so that further shift is no longer added to the extracted portion.

When packets are applied to this extraction bus, only one domain can be extracted within the range of extraction bus width for a set of the mask logic and barrel shifter. In the case where a header of packet is longer than the bus width for extraction, integer domains obtained by dividing the header length of packet to be extracted with a bus width for extraction and then rounding up the fraction can be detected. For example, in the case where the protocol number, source IP address, and destination IP address of IPv4 packet are extracted, since the source IP address field and destination IP address field are continuous keeping an interval as much as the protocol number field, these elements can be extracted with the two sets of mask logic and barrel shifter. Extraction may be made in various extraction patterns but about four to six sets of mask logic and barrel shifter will be enough for such extraction.

As an option, a method has been proposed, in which amounts of shift and mask are not determined uniquely from the result of analysis of packet, a memory in which patterns in amount of shift and mask are programmed is provided adjacent to a set of mask logic and barrel shifter, and amounts of mask and barrel shifter are determined with reference to this memory based on the result of analysis of packet. With the method described above, the necessary information can be extracted from the header information of packet.

Figure 5:
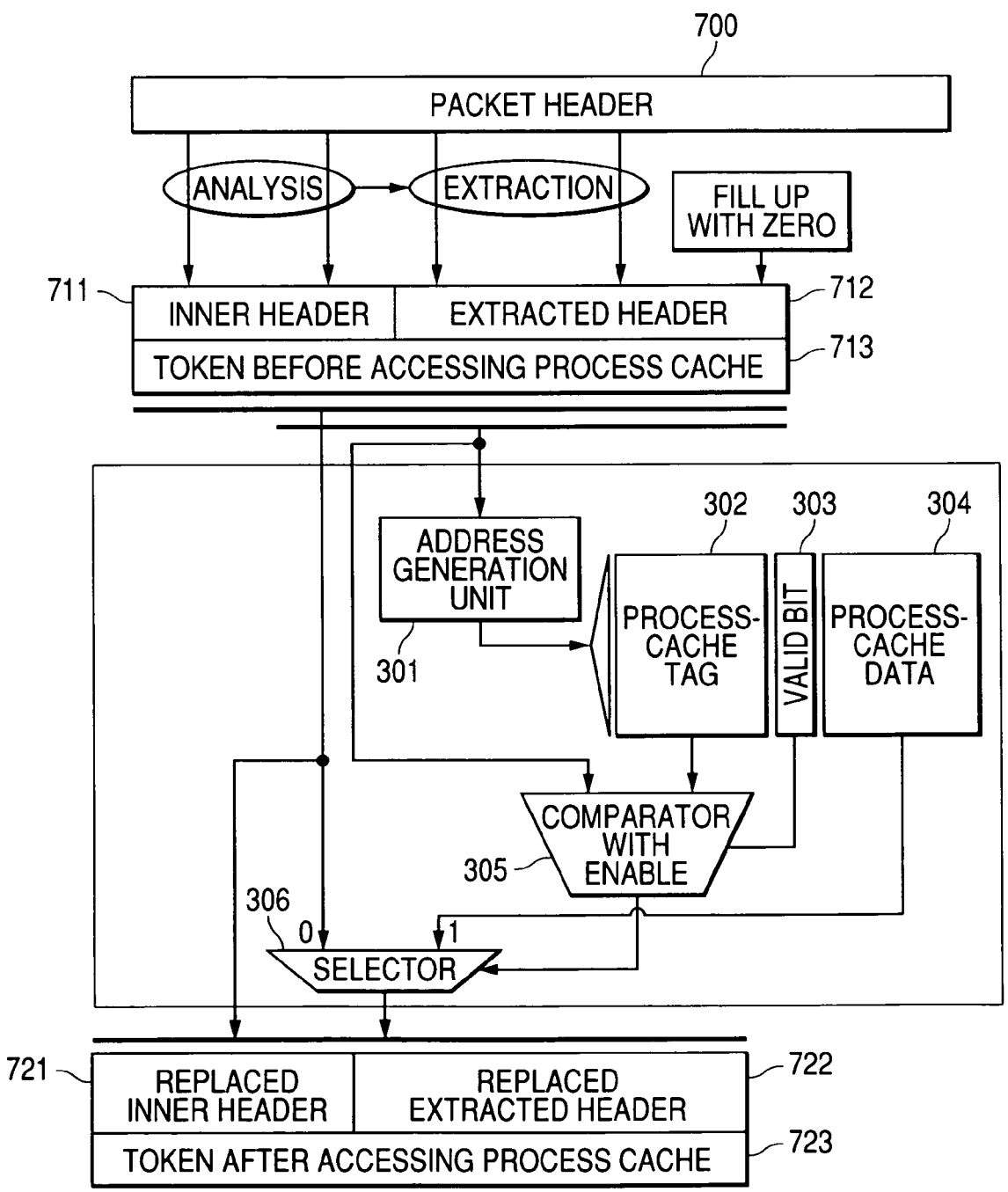
FIG. 5 is a logical diagram of a process-cache unit.

FIG. 5 illustrates an inner constitution of the process cache. In the following description, the information for extracting the necessary information extracted from the header information of the received packet is called an extracted header 712.

Moreover, type of packet obtained through analysis of packet, pointer information to the packet memory 107, and inner information of the network-processor accelerator are conveniently called the inner header 711. A sum of the extracted header and inner head is conveniently called a token 713.

The process cache is constituted with a process-cache tag 302, a valid bit 303, and a process-cache data 304. Moreover, in FIG. 5, a domain enclosed by the dotted line including an address generation unit 301, a comparator with enable 305, and a selector 306 corresponds to the so-called cache memory and a logic related to the cache memory. The process-cache tag 302 records a part of the inner header 711 of the token 713 in the packet which is recorded in the process result thereof and the entire part of the extracted header 712. The valid bit 303 records the data of the related process-cache tag 302 and the information indicating valid or invalid state of the data of the process-cache data 304. The process-cache data 304 records the token including the process result of packet.

Figure 6:
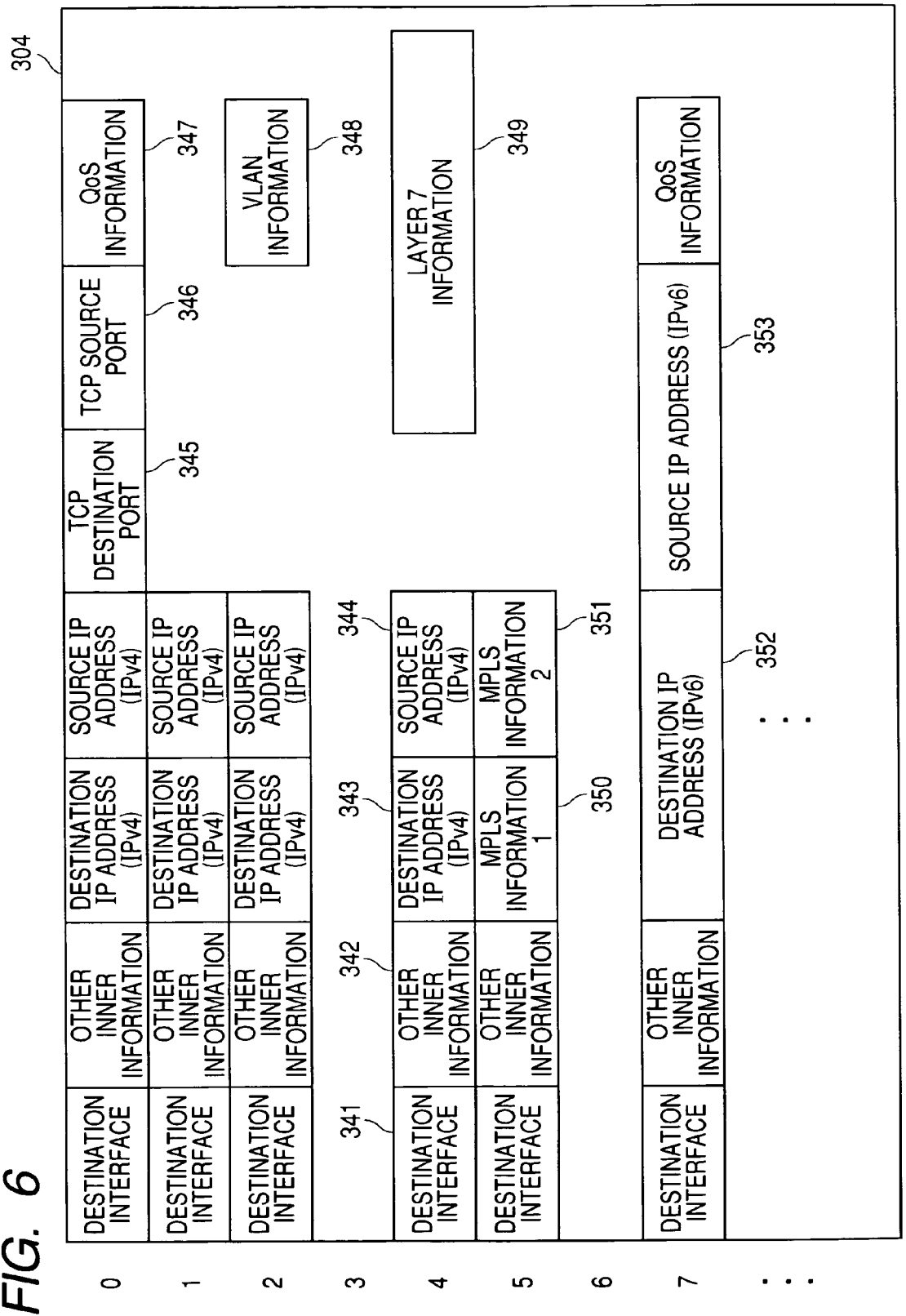
FIG. 6 is a diagram illustrating an example of data format of process cache.

FIG. 6 illustrates a constitution of the process-cache data 304. Format of each entry of the process-cache data 304 is not always required to be identical and can take various data patterns. For example, a certain entry may include, as the inner header after replacement, a destination interface 341 and the other inner information 342 and also include, as the extracted header after replacement, a destination IP address 343 of IPv4, a source IP address 344, the QoS information 347, a TCP destination port 345, and a TCP source port 346 or the like. Meanwhile, a certain entry may include the VLAN information 348, layer 7 information 349, for example, the URL (Uniform Resource Locator) or the like. Moreover, a certain entry may include the MPLS information 350, 351, a destination IP address 352 of IPv6, and a source IP address 353 or the like. The data stored in the process-cache data 304 is used as the information to replace the token 713.

The address generation unit 301 refers to the process cache with a part of the inner header 711 of the token 713, for example, the entire part of the protocol type of the layer 3 and the extracted header 712. However, since the extracted header 712 has the length of about 40 bytes to 64 bytes, for example, because this header include various information pieces in addition to the source IP address and destination IP address of IPv4. Since the number of entries of memory corresponding to this length becomes in-actual huge value as large as $2^{320}$ (two (2) to the three-hundred and twentieth power) to $2^{512}$ (two (2) to the five-hundred and twelfth power), reference to the process cache should be made after reduction of the extracted header 712 in the address generation unit 301.

For example, when the number of entries of process cache is assumed as $2^{(2N+A)}$ (two (2) to the (2N+A)th power) wherein N is an integer 1 or larger and A is 0 or 1, it is possible to utilize a method in which the address is generated by extracting and combining the less significant N bits of the source IP address of the extracted header 712 and the less significant (N+A) bits of the destination IP address, a method in which the address is generated by extracting less significant (2N+A) bits of the destination IP address, and a method in which the address is generated by reducing the extracted header 712 to the (2N+A) bits by utilizing the remainder item of the CRC (Cyclic Redundancy Check) arithmetic operation to the entire part of the extracted header 712. A value obtained from the process-cache tag 302 is compared with the original token 712 with the comparator with enable 305 by making access to the process cache from the token 713 using an address generated with any one of the methods described above. When these values are matched and the process-cache tag is valid (a value of the valid bit 303 is valid), the relevant packet information is assumed to be recorded to the process cache. If these values are not matched or the process-cache tag is invalid (a value of valid bit 303 is invalid), the relevant packet information is assumed to be not yet-recorded (S104).

FIG. 5 illustrates a direct-mapped style in which the process cache uniquely determines an entry assigning position to the packet. However, an n-way set-associative style is also proposed, in which the n entry assigning positions are determined for the packet. When the n-way set-associative style is employed, the n assigning positions are all filled. In this case, since the entry which is filled with writing is selected for registering a new result of packet process, the information bit is given to determine the entry for overwriting the LRU (Least Recently Used) bit to indicate the entry least used by the process cache and FIFO (First In First Out) bit to indicate the oldest entry.

When the relevant packet information is recorded, namely this packet information hits the process cache (branching in the YES direction from S104), the packet information is replaced, through the selector 306, with a token 723 constituted with an inner header 721 including the destination port number recorded to the process cache and an extracted header 722 including result of address translation, except for the intrinsic information of each token such as the serial number included in the inner header 711 of token and the pointer information to the packet memory (S105).

After hitting of the process cache, the post-processing unit 105 reads the original packet from the packet memory 107 on the basis of the packet memory pointer information included in the inner header of token, reassembles the packet by adapting the extracted header information of token to the original packet on the basis of the inner header of token (S106), updates a part of the header of packet in accordance with the inner header information of token (S107), and transmits the packet translated to the format of the output destination of packet in the output interface unit 106 (S108).

When the relevant packet information is not yet recorded to the process cache 103, namely when the process cache miss occurs (branching in the NO direction from S104), the token 723 is transferred to the cache-miss handler 104 to execute the cache-miss process (S110). In this case, the token 723 is identical to the token 713 before access to the process cache.

Figure 7:
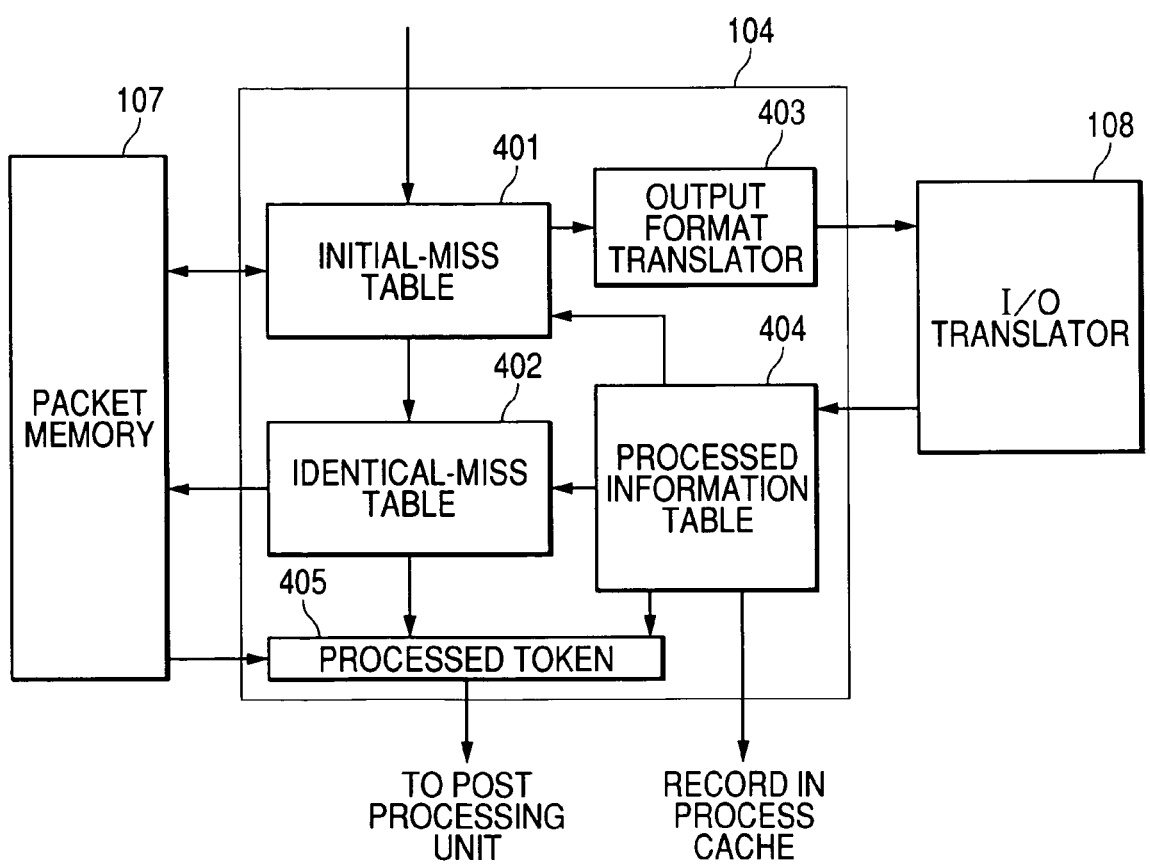
FIG. 7 is a block diagram of a cache-miss handler of the network-processor accelerator.

FIG. 7 illustrates an example of the constitution of the cache-miss handler 104 illustrated in FIG. 3. Operations of this cache-miss handler 104 will be described using a flowchart of FIG. 8.

The cache-miss handler 104 is constituted with a first table 401 (called here as an initial-miss table conveniently) for management of packets under the process request to the outer network processor, a second table 402 (called here as an identical-miss table conveniently) for holding the packet which is expected to provide the identical process result to that of the packet under the management of the initial-miss table 401 without issuing the process request to the outer network processor, an output format translator 403 for translating the format to that which may be transferred to the outer network processor by adding the exclusive header such as the serial number and the flat indicating the process request content to the packet, a third table 404 (called here a process information table conveniently) for reception and management of the packet process result, and a processed token generation unit 405 or the like for applying the processed packet information to the token.

When the packets in which the process results are not yet recorded to the cache memory is received, the network-processor accelerator of FIG. 3 starts the cache-miss process of the step S110 in the flowchart of FIG. 4. First, the process cache 103 transmits the token to the cache-miss handler 104.

Figure 8:
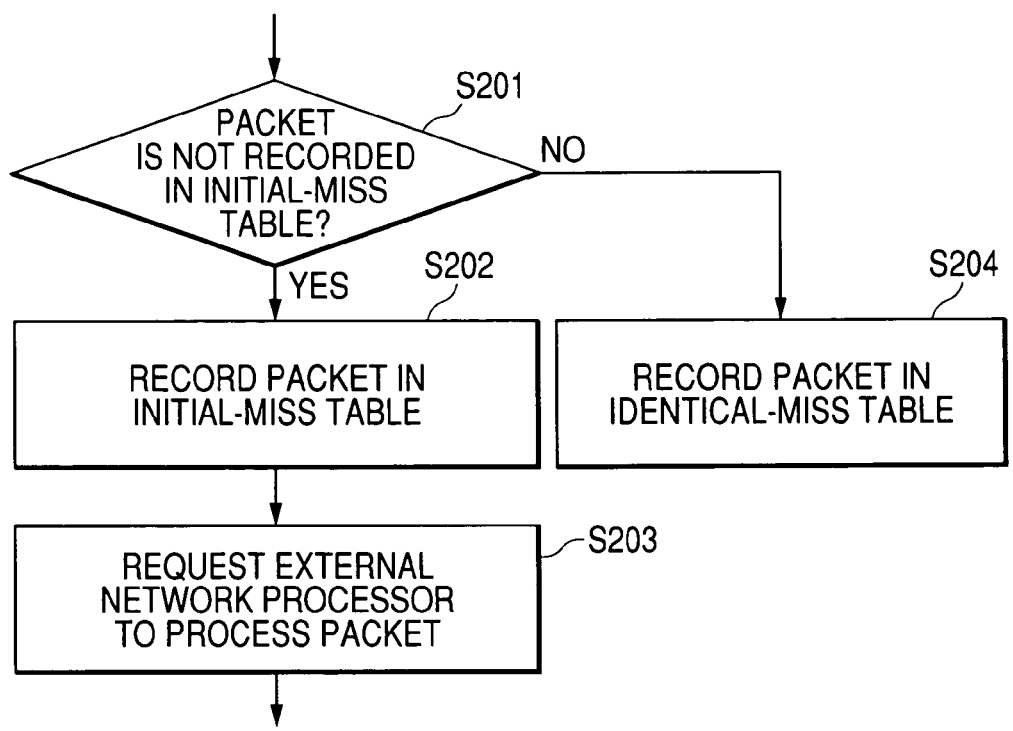
FIG. 8 is a flowchart of packet processes including a cache miss in the network-processor accelerator.

Upon reception of the token, the cache-miss handler 104 refers to the initial-miss table 401 to search whether the relevant token is recorded or not (S201 of FIG. 8).

When the relevant token is recorded to the initial-miss table 401 (branching in the NO direction from S201), only the intrinsic information such as the serial number of each token and pointer information to the packet memory 107 to indicate the original packet information among the inner header of the relevant token is recorded to the identical-miss table 402. Thereafter, the process is once completed without issuance of a packet process request to the outer network processor. (S204).

The identical-miss table 402 is capable of controlling transmission of the packets which result in the identical process result to the outer network processor and reducing a load applied to the outer network processor. This identical-miss table 402 is thought to introduce various constitution methods. In the case of first embodiment, three kinds of typical structural example will be described later.

When the token having generated a process cache miss is not yet recorded in the initial-miss table 401 (branching in the NO direction from S201), the relevant token is recorded to the initial-miss table 401 (S202). The original packet is extracted by referring to the packet memory 107 from the inner header information of token and this packet is then transmitted to the input-output translator 108 with addition of the process contents with which the output format translator 403 requests the process to the outer connected network processor and the header information including the serial number of packet. The input-output translator 108 translates packets to the format of the layer 2 of the MAC frame or the like and to the format of the layer 3 of the IP packet which can be outputted from the network-processor accelerator 13 and requests the process to the outer connected network processor (S203).

In regard to the processes of the outer connected network processor, these processes are identical to that described previously for the network apparatus illustrated in FIG. 1.

Operations up to the step for requesting the packet process to the outer connected network processor from the step for starting cache-miss operation have been described with reference to FIG. 8. Therefore, operations-of the cache-miss handler after reception of the result of packet process requested from the outer connected network process will then be described with reference to the flowchart of FIG. 12.

Figure 12:
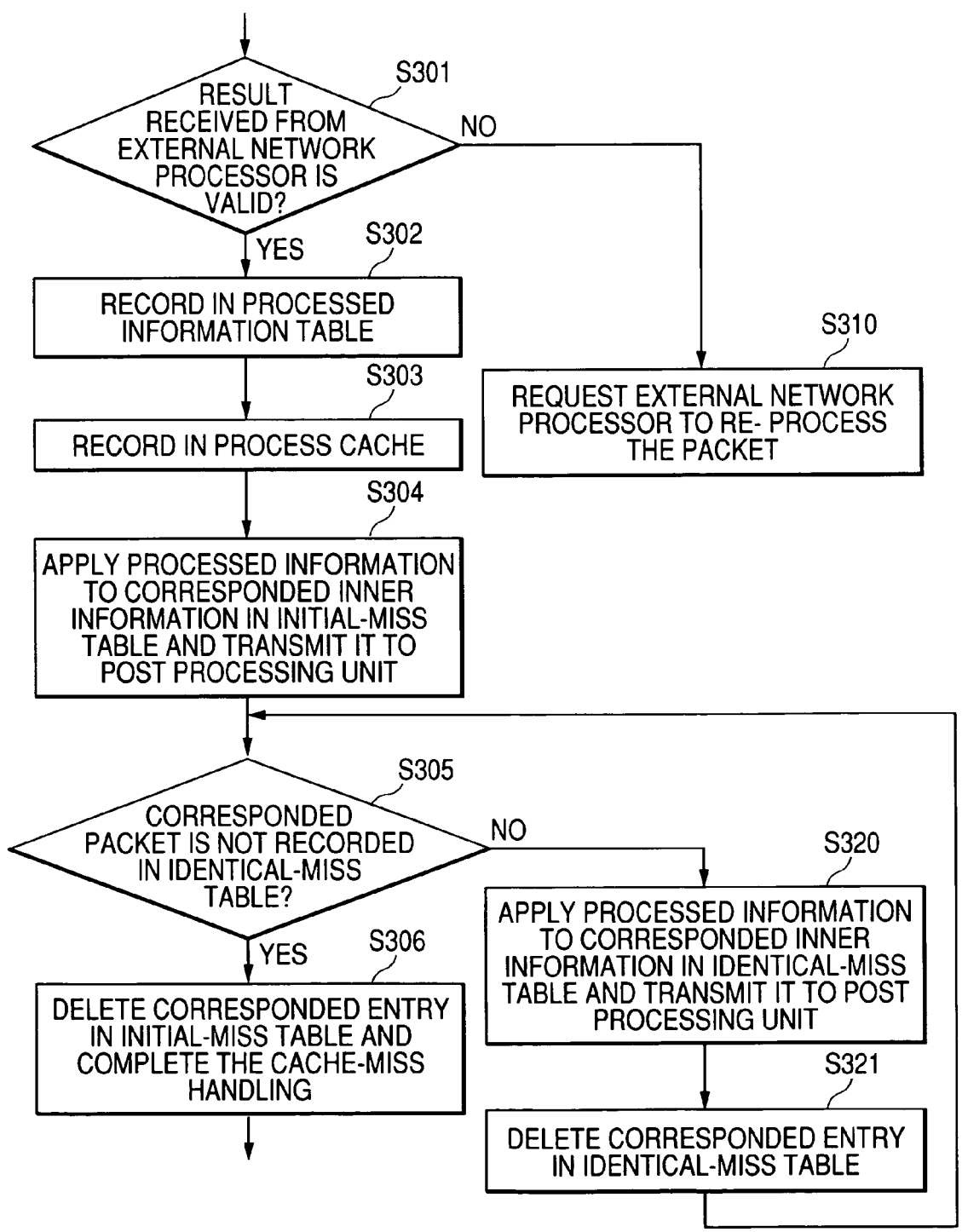
FIG. 12 is a flowchart of packet processes including a cache miss in the network-processor accelerator.

FIG. 12 illustrates processing steps in the cache-miss handler 104 after the network-processor accelerator has received the processed packet information from the outer network processor with the input- output translator 108.

The cache-miss handler 104 searches (S301) the received header and sends (S310) again a process request of the packet to the outer network processor, if the received packet is invalid (branching in the NO direction in the step S301). When the received packet is valid (branching in the YES direction in the step S301), the cache-miss handler 104 records the processed packet information to the processed information table 404 and the corresponding information to the process cache 103 (S303). When the process cache employs the constitution of direct-mapped style, if the valid entry is already set to the recorded entry, the packet is recorded in direct by the overwriting. When the constitution of the process cache employs the set-associative style of n-way, the packet is recorded to the entry of vacant way. However, if the n-way is all filled up with entries, the entry to be recorded is determined based on the bit information such as LRU or the like for determining the overwriting position and the relevant information is overwritten to this entry.

Moreover, the process result is applied to the entry of the initial-miss table 401 corresponding to the processed packet, namely the token replacement process which is similar to that executed for the hitting in the process cache 103 is implemented and the process result is transmitted to the post-processing unit 104 (S304).

Moreover, the identical-miss table 402 is also scanned to confirm existence of the relevant entry (S305). When the relevant entry is found (branching in the NO direction of S305), the token replacement process is executed to the first relevant entry of the identical-miss table 402 together with the necessary information of the relevant entry of the initial-miss table 401, and the process result is then transmitted to the post-processing unit 104 (S320) to delete the relevant entry of the identical-miss table 402 (S321).

Thereafter, the processes in the steps S305, S320, and S321 are repeated until the relevant entry is removed from the identical-miss table 402, when the relevant entry disappears (branching in the YES direction of S305), the relevant entry is deleted from the initial-miss table 401 and a series of cache-miss processes for the relevant packet are completed (S306).

As an example of constitution, the initial-miss table 401 is allowed to have one time-out counter in every entry. When a counter value has exceeded the preset threshold value after the packet has been transmitted to the outer network processor, the process of the relevant packet is requested again to the outer network processor under the condition that outer network processor has generated packet loss.

Useless process request to the outer connected network processor can be saved by providing the cache-miss handler. Moreover, since the process result can be applied to all relevant packets after the process result is received from the network processor, the packet having generated a miss in the process cache can be processed under the condition that it is recorded to the process cache, namely under the condition identical to the hitting of the process cache.

Figure 9:
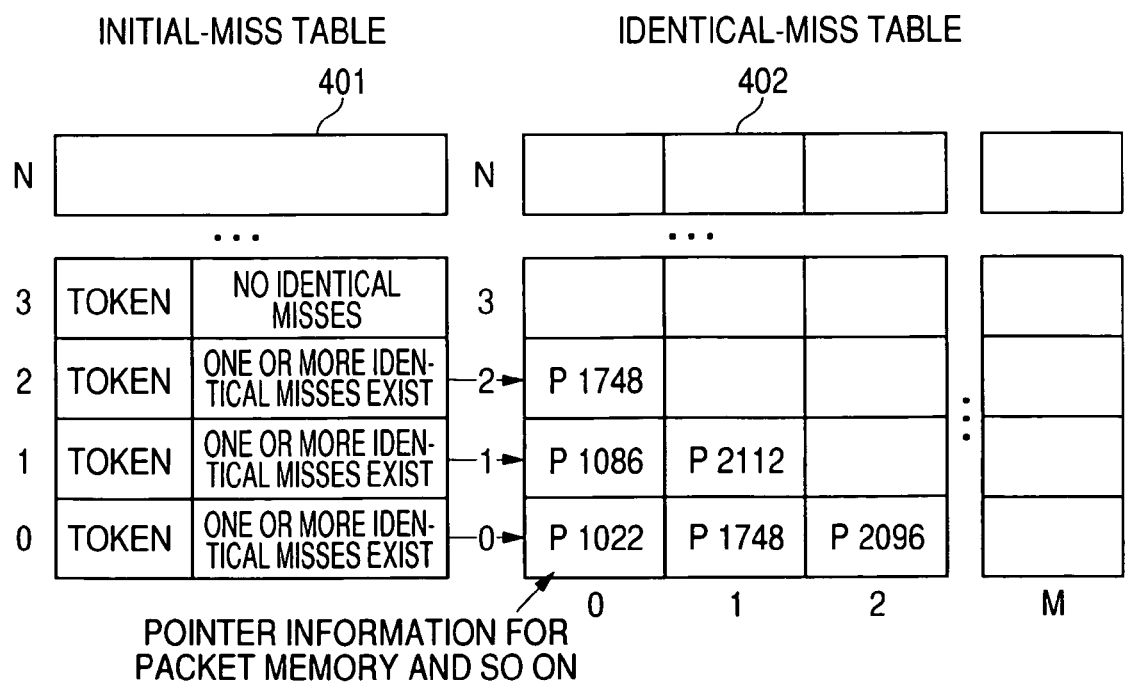
FIG. 9 is a diagram illustrating management of an identical-miss table in the cache-miss handler of the network-processor accelerator with a queue of fixed size.
Figure 10:
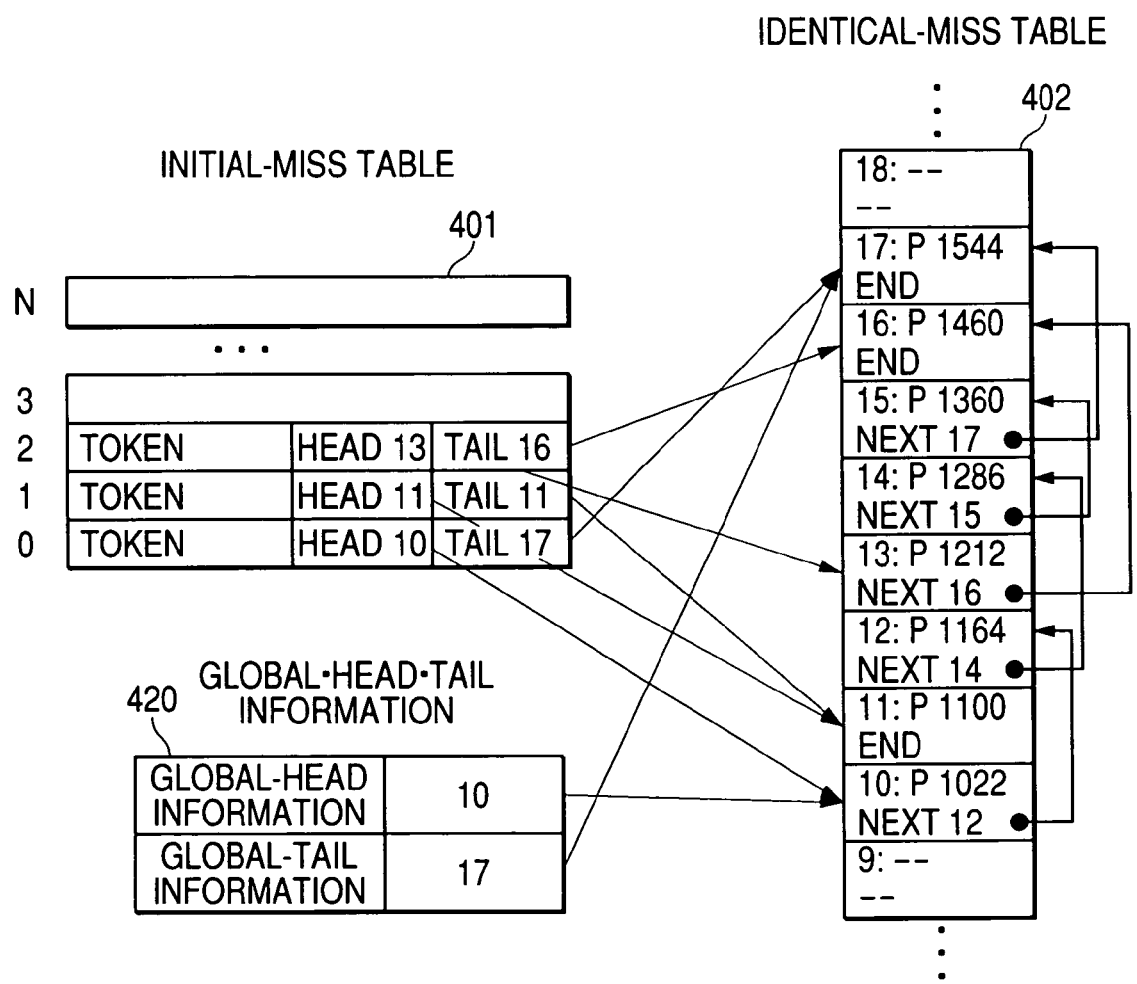
FIG. 10 is a diagram illustrating management of the identical-miss table in the cache-miss handler of the network-processor accelerator with a coupling list system.
Figure 11:
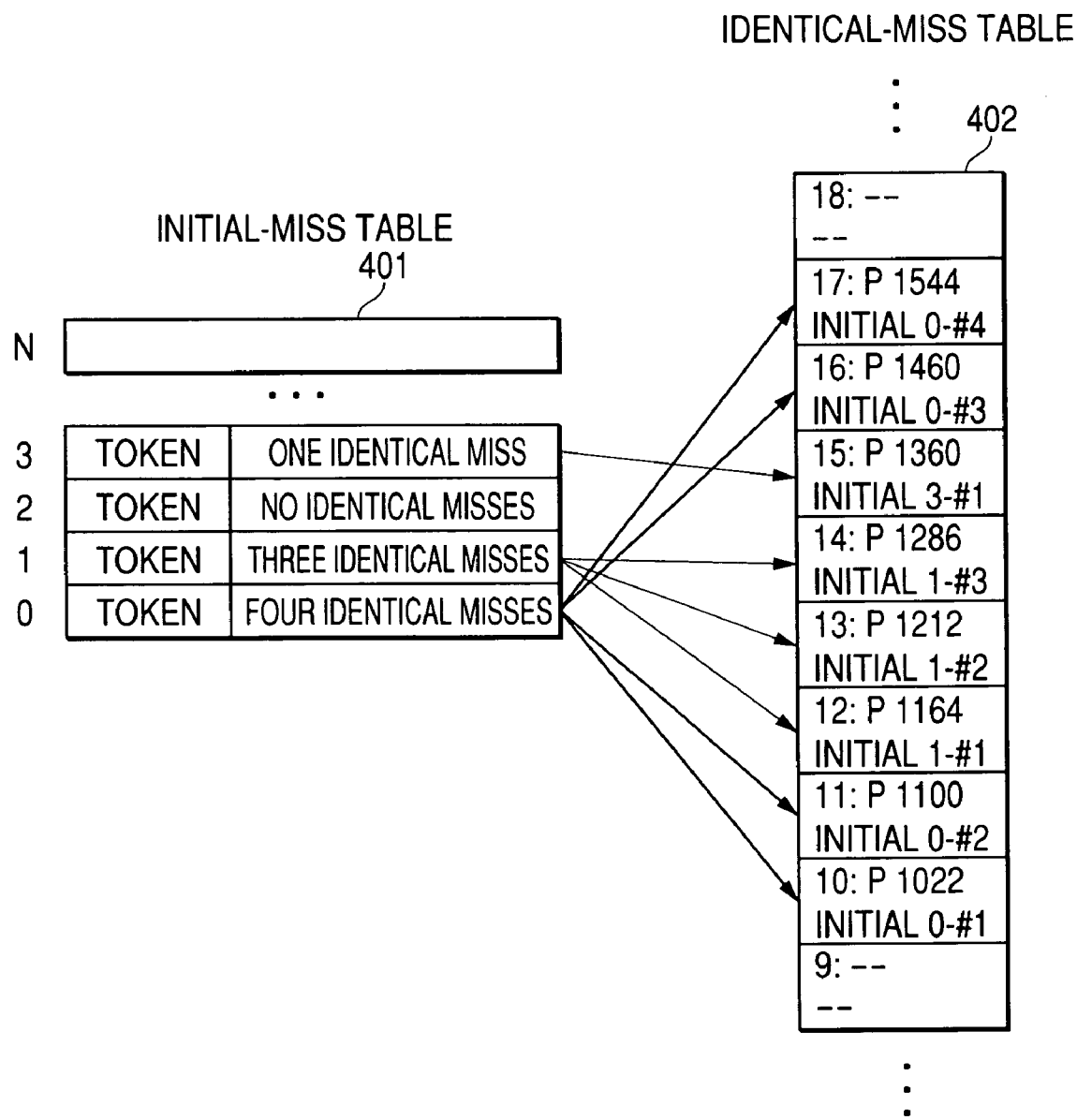
FIG. 11 is a diagram illustrating management of the identical-miss table in the cache-miss handler of the network-processor accelerator with a CAM (Content Addressable Memory) or a fully associative memory.

FIG. 9, FIG. 10, and FIG. 11 illustrate three kinds of examples of the typical constitutions of the identical-miss table of FIG. 7. When any method is employed, the relevant token can be held until the entries, which may be used for the relevant packet (token) and prepared in the identical-miss table 402, have been used completely. However, after the entries are used completely, the packets (token) received thereafter are discarded.

The identical-miss table 402 of FIG. 9 is an example of the constitution having the number of queues which is equal to N when the number of entries of the initial-miss table 401 is set to N. In FIG. 9, depth of each queue is set to M. The initial-miss table 401 has the bits indicating whether the cache-miss token is also held in the identical-miss table 402 or not. The cache-miss handler 104 records, upon reception of the token and detection of the identical token in the initial-miss table 401, the identical token to the vacant entry of the queue in the identical-miss table 402 corresponding to the entry of the initial-miss table 401. If there is no vacant entry in the queue of the relevant identical-miss table 402, the packet corresponding to the relevant token is discarded.

When the process result of token corresponding to the processed information table 404 exists, this result is sequentially applied to all entries of the corresponding queue of the identical-miss table 402 and the entries of the identical-miss table 402 are sequentially released from the applied entry.

FIG. 10 illustrates an example of the constitution of the linked-list style of the identical-miss table 402. Each entry of the initial-miss table 401 has the head information indicating the start position on the identical-miss table 402 and the tail information indicating the end position thereof of a set of entries as a linked list. The entry of the identical-miss table 402 has the link information indicating whether the identical token exists or not. In the link information, the information END indicating that the next identical token does not exist on the identical-miss table 402 is written at the time of initial recording. However, when the next identical token is received, the pointer information indicating the entry position on the identical-miss table 402 for the recording of the next identical token is re-written (updated) to the END part of the first entry. Moreover, the tail information of the relevant entry of the initial-miss table 401 is also updated. As described above, the link information can be extended through the linking. In addition, a global-head-tail management table 420 is also prepared for management of the global-head information indicating the head part of the identical-miss table 420 and the global-tail information indicating the tail part thereof. Accordingly, the head position of entry and the tail position of entry used in the identical-miss table 402 can be detected with the global-head-tail management table 420.

When the process result of the token corresponding to the processed information table 404 exists, the entries of the identical-miss table 402 are sequentially released by applying such process result to the token of the relevant entry by referring to the link information of the identical-miss table 402 recorded to the entry number of the corresponding initial-miss table 401. When the head position and tail position of entry in the entire part of the identical-miss table 402 are changed with such releasing, the global head information and the global trail information in the global-head-tail management table 420 are also modified.

The identical-miss table 402 of FIG. 11 illustrates an example of constitution formed of CAM or fully associative memory. The initial-miss table 401 has a counter which indicates the number of cache-miss tokens held in the identical-miss table. The cache-miss handler 104 selects and records, upon reception of the token and finding of the identical token in the initial-miss table 401, the vacant entry on the identical-miss table 402 to give increment of one (1) to the counter. Selection of this entry is determined through combination of the entry number of the initial-miss table 401 and the number for indicating the arrival number of the identical-miss table 402 for this entry number. Since the identical-miss table 402 is CAM or fully associative memory, an entry assigning position itself can be determined freely among the total number of entries of CAM or fully associative memory. If there is no vacant entry in the CAM or fully associative memory, the packet corresponding to the relevant token is discarded.

When the process result of token corresponding to the processed information table 404 exists, the process result is applied to the entry of the identical-miss table 402 indicated by combination of the entry number of the corresponding initial-miss table 401 and an integer K in order to sequentially release the entry of the identical-miss table 402 from the entry to which the process result has been applied. Here, the integer K is ranged from 0 to the value indicated by the counter recorded to the entry of the relevant initial-miss table 401.

Next, returning to FIG. 3, constitution and operations of the latter stage of the cache-miss handler 104 will be described. The post-processing unit 105 has the paths to receive the token 723 in which the information is replaced through the hitting of the process cache 103 and the token 723 in which the information is replaced through the process in the external network processor via the cache-miss handler 104 with hitting-miss of the process cache 103.

The post-processing unit 105 makes access to the packet memory 107 on the basis of the inner header information of the received token and receives the original packet. And the post-processing unit 105 executes re-assembly of packet, addition, deletion, replacement, modification of header information, for example, modification of TTL (Time to Live) of IPv4 and calculation of header check sum (S106, returning to the flowchart of FIG. 4) by applying extraction header information of the token in accordance with the inner header information of token. Since the post-processing unit 105 is also required to ensure high-throughput operation as in the case of the packet analysis unit 102, the method in which the barrel shifter set and mask logic are combined like the pipeline is also applied as in the case of the packet analysis unit 102.

Finally, the packet is outputted through translation into the format for outputting the packet in the output interface unit 106. In this case, when the network-processor accelerator is connected to the switch fabric, the header information for switch fabric is added to the packet. For example, a port number or the like of the switch fabric is included to such header information. Therefore, this port number can be used because it is included in the inner header in the token. When the network-processor accelerator is connected to the network interface, the packet is outputted after it is translated to the format of layer 2 or layer 3 which is supported by the network interface. When the output destination network interface has a plurality of output ports, the network interface as the output port is determined by utilizing the port number included in the inner header of the token (S107).

The first preferred embodiment of the network apparatus utilizing the network-processor accelerator of the present invention and the network-processor accelerator itself have been described above. This description relates only to the first embodiment, does not limit the scope of the present invention, and can be adapted to various changes or modifications of the present invention.

Second Embodiment

Figure 13:
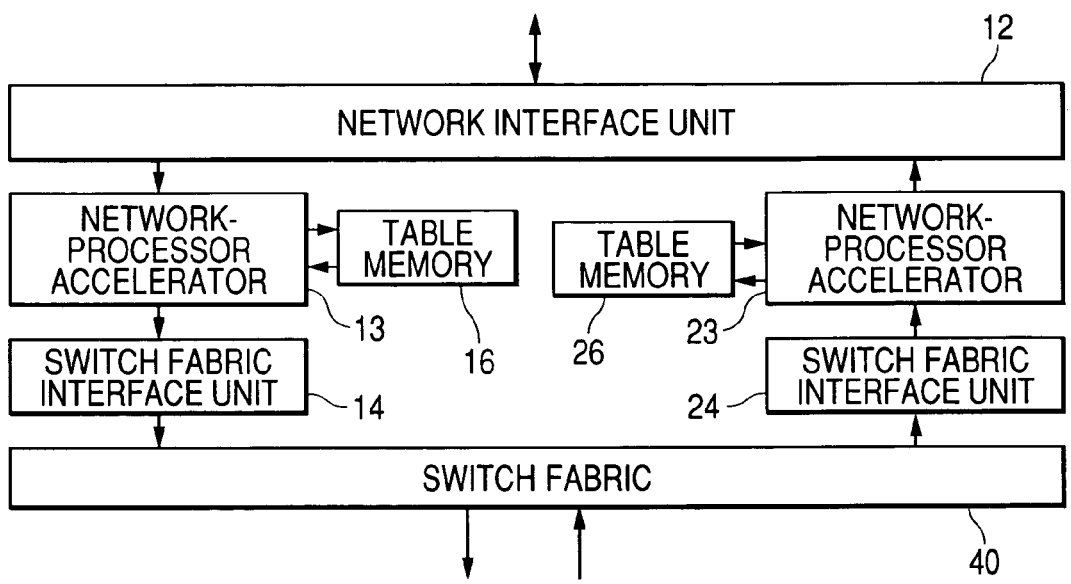
FIG. 13 is a block diagram of the network apparatus constituted without use of an outer network processor, using the network processor or network-processor accelerator including integrated processors in the second embodiment of the present invention.

FIG. 13 illustrates an example of constitution of the network apparatus as the second embodiment of the present invention utilizing a network-processor accelerator that includes conventional processors or a conventional network processor on the same chip and is not connected with an external network processor. The network-processor accelerator of the constitution described above mounts integrated processors in the position of the input-output translator of FIG. 3 or the conventional network processor within the same chip after the input-output translator.

The basic flow of packet process is identical to that in the first embodiment. However, the packet which has generated a cache miss in the process cache of the network-processor accelerator is processed by the integrated processors or the integrated network processor mounted to the network-processor accelerator. As the constitution of a cache-miss handler, the method used in the first embodiment can be applied in direct.

The external connected table memories 16, 26 are accessed from the integrated processors or the integrated network processor included in the network-processor accelerators 13, 23.

A merit of integrated processors in the constitution of the second embodiment is that since the processes of packet to be recorded to the process cache can be executed by the integrated processors mounted on the identical chip, overhead for transmitting the packet to be processed to an external network processor of the network-processor accelerator or receiving the packet from the external network processor can be saved. A merit of inclusion of the integrated network processor in the constitution of the second embodiment is that it is no longer required to provide input-output pins which are enough for the interface of a conventional network processor.

A demerit of the integrated processors or the integrated network processor in the constitution of the second embodiment is that a chip domain must also be assigned for those integrated processors. Those integrated processors consume large chip area.

Third Embodiment

Figure 14:
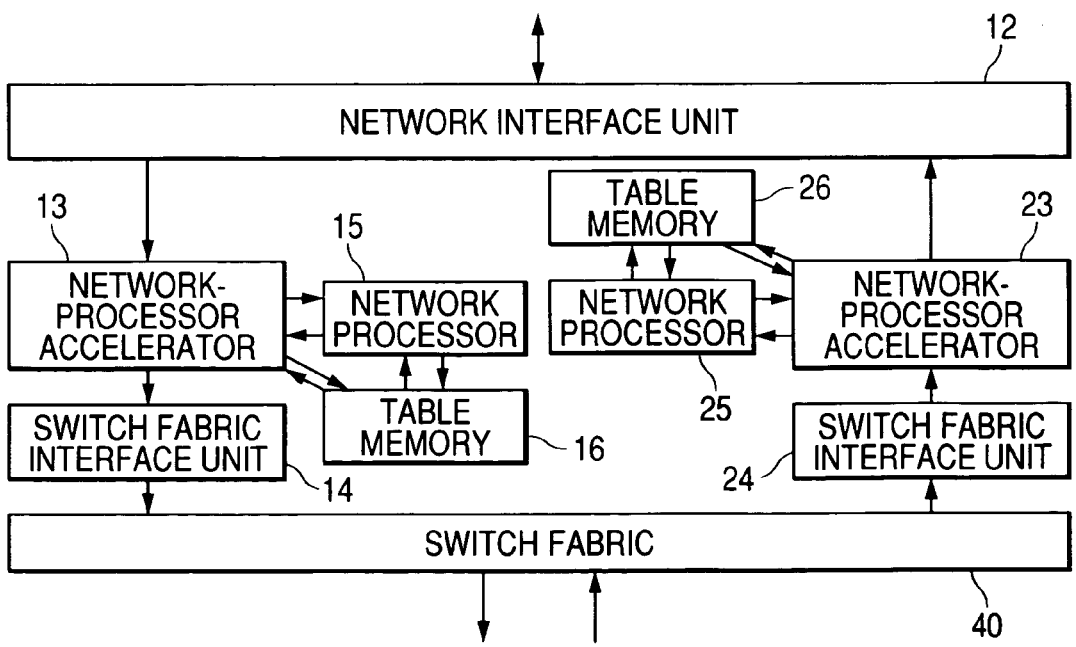
FIG. 14 is a block diagram of the network apparatus constituted using the network-processor accelerator including the integrated network processor or the integrated processors and also the outer network processor in the third embodiment of the present invention.
Figure 15:
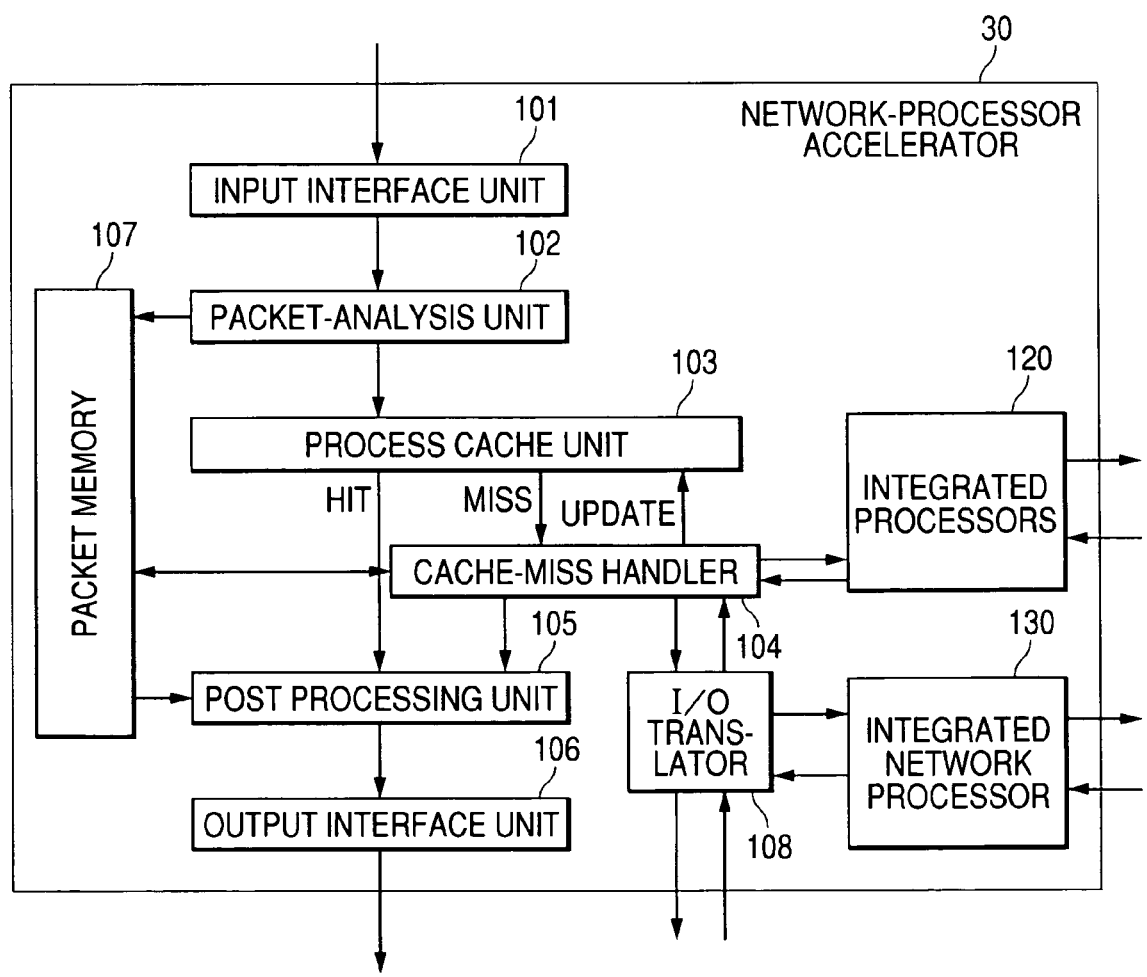
FIG. 15 is a block diagram of an inner constitution of the network-processor accelerator including the integrated network processor or integrated processors in the second or third embodiment of the present invention.

FIG. 14 illustrates an example of constitution of a network apparatus as the third embodiment of the present invention utilizing a network-processor accelerator including integrated processors or a integrated network processor and connecting an external network processor. FIG. 15 illustrates an example of constitution of the network-processor accelerator used in the network apparatus in the constitution described above. Large differences in the constitution of this network-processor accelerator from that of FIG. 3 are that the integrated processors 120 or the integrated network processor 130 is provided, the cache-miss handler 104 is provided with the interface for both integrated processors 120 and the input-output translator 108, and the input-output translator 108 has the interfaces for connection with the external network processor and that for the integrated network processor 130 to be mounted on the chip.

It is enough to provide any of the integrated processors 120 and integrated network processor 130. However, it is also possible to provide both of these processors (120 and 130).

The basic flow of the packet process is identical to that of the first embodiment. The packet which has generated cache-miss in the process cache of the network-processor accelerator is processed in the integrated processors 120 or the integrated network processor 130 mounted to the network-processor accelerator. When the packet having cache miss has newly arrived during the processes in these processors, a request for process is issued to the external connected network processor through the input-output translator 104. For the constitution of the cache-miss handler, the method of the first embodiment may be applied in direct.

The external connected table memories 16, 26 are accessed from the integrated processors and/or the integrated network processor of the network-processor accelerators 13, 23 and external connected network processors 15, 25. An arbiter for table memories 16, 26 is required for controlling accesses among processors in order to avoid competition of accesses.

A merit of use of integrated processors of the constitution of the third embodiment is that transmission and reception overhead of packet for the external side of chip can be saved because all processes can be executed only with the network-processor accelerator while the number of processing processors in the integrated processors is enough for the number of packets having generated process-cache miss. In addition, if the packet-processing throughput of the integrated processors-is insufficient, such insufficient processing throughput can be compensated by adding the external connected network processors. A merit of use of the conventional integrated network processor in the constitution of the third embodiment is that it is no longer required to newly design integrated processors.

A demerit of use of the integrated processors or the integrated network processor in the constitution of the third embodiment is that the large area of chip is consumed for those processors. Moreover, since the interface to the external connected conventional network processor is also required, the area and input-output pins for such interface are also required.

Fourth Embodiment

Figure 16:
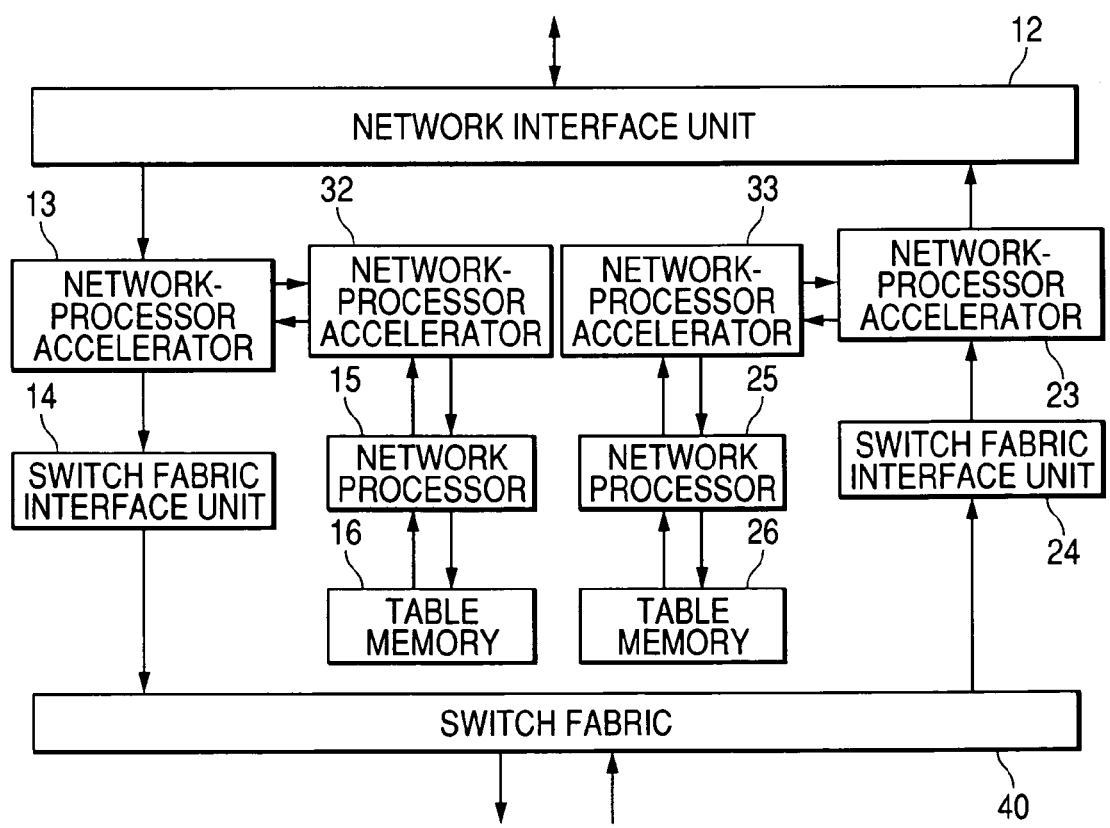
FIG. 16 is a block diagram of the network apparatus constituted by using one or more network-processor accelerators between the network-processor accelerator in the fourth embodiment of the present invention and the outer network processor.

FIG. 15 illustrates an example of constitution of the network apparatus as the fourth embodiment of the present invention, further connecting, after the input-output translator of the network-processor accelerators 13, 23, an input interface of the network-processor accelerators 32, 33 and connecting, after the input-output translator of the network-processor accelerators 32, 33, a network processor. In FIG. 16, the network-processor accelerator is constituted in two stages but a hierarchical constitution can also be formed by continuously connecting a network-processor accelerator between the network-processor accelerator 13 (or 23) and the network-processor accelerator 32 (or 33). The network-processor accelerator used in this constitution is not required to provide integrated processors as in the case of the second and third embodiments, but it is also allowed to provide the integrated processors.

If a cache miss is generated in the network-processor accelerator located in the most hierarchical layer farthest from the external connected network processor, the relevant packet is transmitted to the chip corresponding to the lower layer through the input-output translator. When the network-processor accelerator is located in the lower layer, the process cache of the network-processor accelerator in the lower layer is referred. If a cache-hit occurs, the hit data thereof is transmitted to the network-processor accelerator of the upper layer. If a cache miss occurs, transmission of the relevant packet to the lower layer is repeated until the packet reaches the network processor.

In the network processor in the lowest layer, packet process is executed as in the case of the first, second, and third embodiments and the result is transmitted to the upper layer network-processor accelerator.

Here, an example of recording to the process cache of the network-processor accelerator to be placed in the intermediate layer will be described. The result of packet process transmitted from the lower layer is not recorded to the process cache of the network-processor accelerator in the intermediate layer but is always recorded to the process cache in the uppermost layer. If the relevant entry is filled up in the process cache in the uppermost layer, when the network-processor accelerator is located in the lower layer, one of the relevant entries is selected, the data of this entry is transferred to the process cache of the lower layer, and the entry is assigned to the latest data. In addition, if the transferred data cannot be recorded because the relevant entry of the process cache in the lower layer is filled, one entry is selected from such relevant entries, the data of this entry is transferred to the process cache of the lower layer, and the entry is assigned for the data transferred from the upper layer. The processes described above are recursively repeated. When the network process is located in the lower layer, only the relevant data is overwritten in the process cache of the network-processor accelerator.

Moreover, the post-processing unit of network-processor accelerator located in the intermediate layer is not required to perform reassembly work of the transmitting packet unlike the post-processing unit of the network-processor accelerator of the uppermost layer. It is only required to transmit the header including the serial number of packet which may be recognized by the upper layer through attachment on the token in the form of recording to the process cache.

A merit of the constitution of the fourth embodiment of the present invention is that a total capacity of the process cache increases in accordance with the number of network-processor accelerators connected and thereby a large amount of packet process results can be stored. A process cache of each network-processor accelerator can be assumed as a layer-cache in the ordinary processors. Accordingly, if a process cache miss occurs in the uppermost layer cache corresponding to the primary cache, the packet process in the lowermost network processor is not required when the process cache in the next network-processor accelerator corresponding to the secondary cache is hit, or the process cache in the still lower layer is hit.

A demerit of the constitution of the fourth embodiment is that a cost of components of the network apparatus rises in accordance with the number of network-processor accelerators connected. Moreover, the fourth embodiment is valid only in the range of Ta<Tb, when the time required to transfer the relevant data to the uppermost layer from the process cache of the network-processor accelerator of the lowermost layer is defined as Ta and the time required to transfer the relevant data to the network-processor accelerator from the network processor by connecting in direct the network processor to the network-processor accelerator of the uppermost layer is defined as Tb.

Fifth Embodiment

Figure 17:
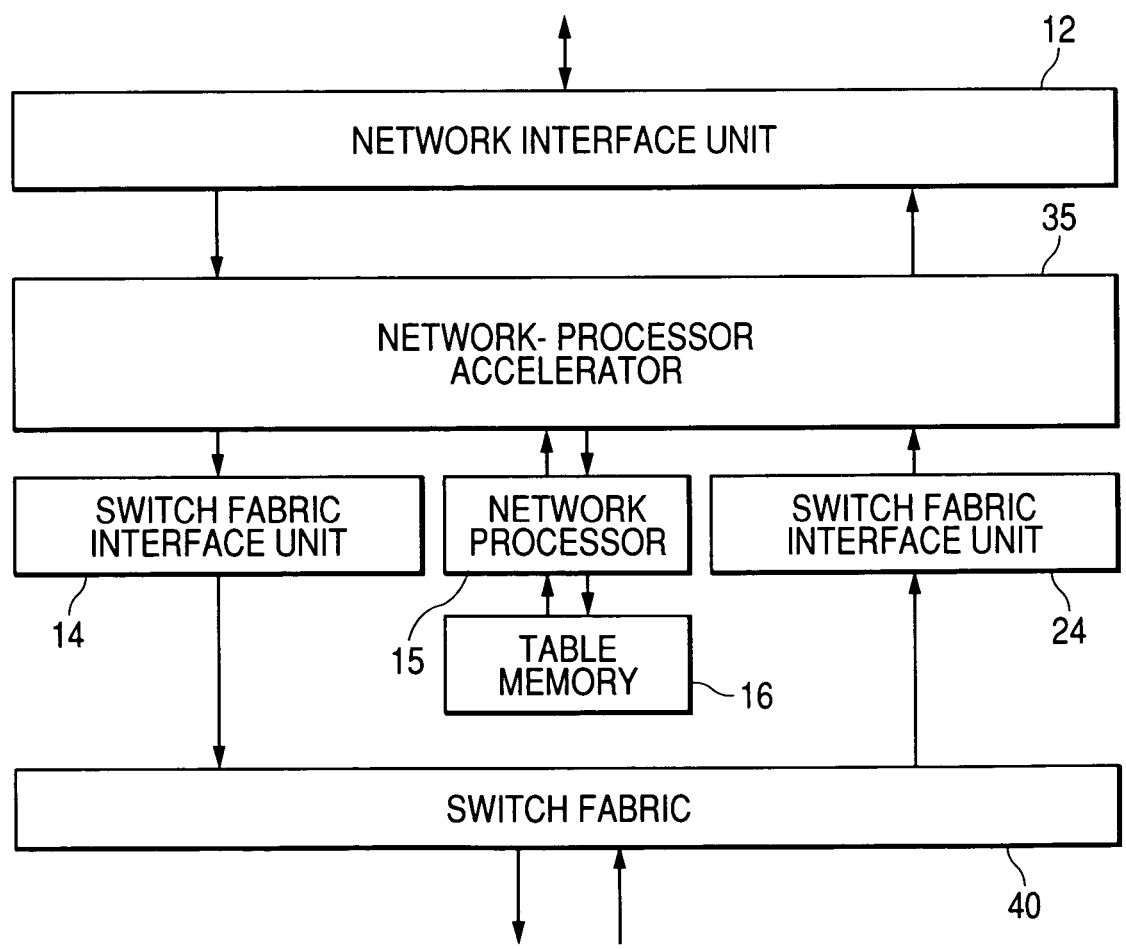
FIG. 17 is a block diagram of the network apparatus constituted by using in common the network-processor accelerators in the input and output sides and connecting the outer network processor in the fifth embodiment of the present invention.
Figure 18:
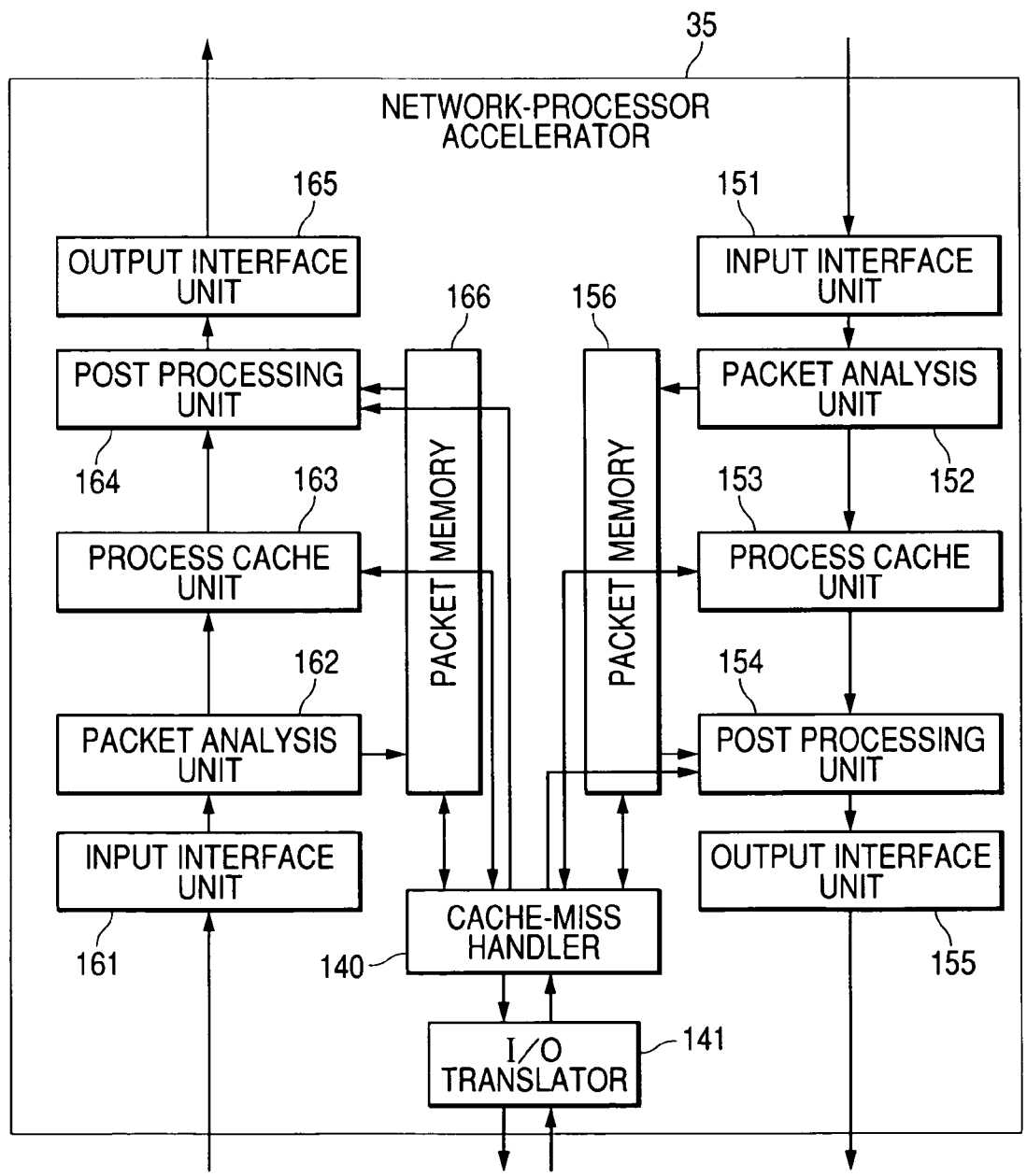
FIG. 18 is a block diagram of the inner constitution of the network-processor accelerator for use in common in the input and output sides in the fifth embodiment of the present invention.

FIG. 17 illustrates an example of constitution of a network apparatus as the fifth embodiment of the present invention mounting a network-processor accelerator 35 for processing the packets both of the input and output side from the network on the single chip. This network-processor accelerator 35 includes, on the same chip, independent input interfaces 151, 161, packet analysis units 152, 162, process-cache units 153, 163, post process units 154, 164, output interfaces 155, 156, packet memories 156, 166 for input and output respectively. The packet (token) having generated a cache miss in the respective process-cache units is processed with a common cache-miss handler 140 and a request of packet process is issued to the external connected network processor 15 through the common input-output translator 141.

The common cache-miss handler 140 performs the processes which are identical to that of the cache-miss handler 104 of the network-processor accelerator of the first embodiment, except for that a management flag for the packets in the input and output sides is added.

A merit of the constitution of the fifth embodiment is that the number of components of the network apparatus can be reduced.

A demerit of the fifth embodiment is that since the network-processor accelerator has the logics of both input and output sides for the network, the chip area is enlarged in comparison with the network-processor accelerator having only one logic of input or output.

Sixth Embodiment

Figure 19:
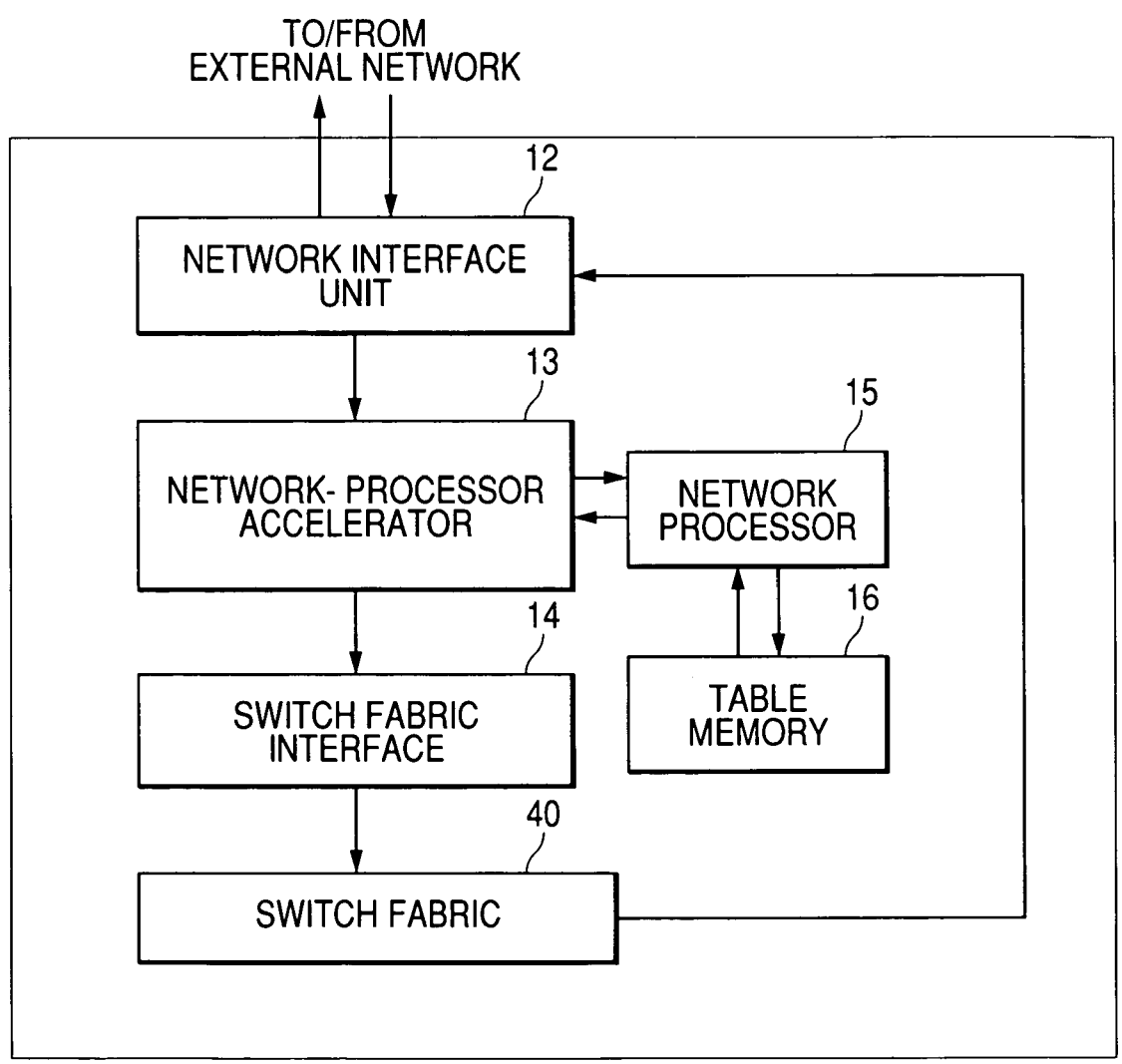
FIG. 19 is a diagram for describing the principle operation of the present invention.

FIG. 19 illustrates an embodiment of the constitution of the network apparatus using a network processor and a network-processor accelerator. Constitution and operation of individual devices are similar to that described in regard to the first embodiment. It is possible from the point of view of principle to constitute the network apparatus through combination of the input and output sides. In this network apparatus, operation becomes rather slow but this apparatus has a merit in the manufacturing cost because the constitution is rather simplified, in comparison with the apparatus illustrated in FIG. 1, wherein the independent network-processor accelerator 13 and network processor 15 are provided for the input switch fabric interface and output switch fabric interface.

The packet transfer process may also be realized on software using general purpose CPUs (Central-processing units) in place of the network processor 15. In this case, an external controller is required to install software for packet process when the CPUs are activated.

Like the first embodiment, connections of devices after the network-processor accelerator 13, network processor 15, and table memory 16 are mounted on the substrate can be made through the wiring pins provided to each device.

When the hitting rate of process cache is 90%, a network apparatus having the peak packet-processing throughput which is equal to 10 times the rate of the network processor connected to the network-processor accelerator can be constituted. Even when the hitting rate of the process cache is 50%, the peak packet-processing throughput of two times the rate of the network processor can be attained. In this case, the network-processor accelerator is required to have the capability of bit manipulation in the rate corresponding to the higher throughput than that of the network processor. However, since complicated program process is generally not required only for the bit manipulation, such bit manipulation can be realized only with hardware.

The network-processor accelerator of the present invention is capable of constituting a high-throughput network apparatus which ensures the processing throughput higher than that of the packet process of the high-end network processor by complementarily using the conventional high-end network processor. Moreover, it is also possible to constitute, at a lower cost, a middle-class network apparatus by complementarily using the low-end network processor.

What is claimed is:

1. A network apparatus comprising:
a network interface for transmitting and receiving packets to and from a network;
a network processor for transferring the received packets to a next transfer destination;
a table memory for storing a table referred for the transfer of packets; and
a network-processor accelerator for transferring the received packets;
wherein the network-processor accelerator transfers the received packets having the destination addresses which are identical to that of the received packets already processed with the network processor, and
wherein the network-processor accelerator, comprises:
an interface unit for temporarily storing the received packet;
a packet analysis unit for obtaining the extracted information by extracting the necessary domain from the received packets;
a cache memory for storing the process result required for transfer process of the received packets;
an address generation means for referring to the cache memory from the extracted information;
a means for determining whether the relevant information exists or not in the cache memory as the result of reference to the cache memory from the extracted information;
a means for reassembling the packets from the relevant information when the relevant information exists in the cache memory;
a primary table for management of the packets as cache miss packets when the relevant information does not exist in the cache memory;
a secondary table for management of the second and subsequent packets that are containing the relevant information not existing in the cache memory and are expected to provide the process result which is identical to that of the packets recorded in the primary table;
an interface unit for transmitting the packets and necessary information to the network processor for implementing, with a programmable manner, the processes of cache miss packet recorded to the primary table;
an interface unit for receiving the processed packets and added information from the network processor;
a means for recording the process result information of the processed packets to the cache memory;
a means for applying the process result to the relevant packets recorded to the secondary table;
a means for releasing the entries of the primary and secondary tables having completed the processes;
a means for generating the transmitting packets from the processed packets or the process result information; and
an interface unit for transmitting the processed packets.

2. The network apparatus according to claim 1, comprising:
a first network-processor accelerator including a first integrated cache memory;
a second network-processor accelerator including a second built-in cache memory;
a first network processor connected to the first network-processor accelerator;
a second network processor connected to the second network-processor accelerator;
a switch fabric; and
an input switch fabric interface and an output switch fabric interface connected to the switch fabric;
wherein the first network-processor accelerator is allocated between the network interface and the input switch fabric interface, while the second network-processor accelerator is allocated between the network interface and the output switch fabric interface.

3. The network apparatus according to claim 2,
wherein the first network-processor accelerator and the second network-processor accelerator are constituted by the identical network-processor accelerator, and the first network processor and the second network processor are constituted by the identical network processor.

4. The network apparatus according to claim 1,
wherein the network processor is integrated in the network-processor accelerator.

5. The network apparatus according to claim 1,
wherein the network processor comprises the table memory.

6. The network apparatus according to claim 1,
wherein a plurality of other network-processor accelerators are connected between the network processor and the network-processor accelerator.

7. The network apparatus according to claim 1, wherein the network-processor accelerator includes the cache memory;
a switch fabric;
an input switch fabric interface and an output switch fabric interface connected to the switch fabric;
wherein the network-processor accelerator is provided in common between the input switch fabric interface and the output switch fabric interface.

8. The network apparatus according to claim 1, further comprising:
a plurality of network processors; and
an interface unit for switching the connections between a plurality of network processors and the network-processor accelerator.

9. The network apparatus according to claim 1, further comprising:
a packet memory which is external connected to the network-processor accelerator or the network processor to temporarily store the received packets.

10. The network apparatus according to claim 9, wherein the network-processor accelerator and the network processor are independently provided with the external connected packet memory.

11. The network apparatus according to claim 1, wherein the relationship of NPin+NPout>NAin is established among the number of wires NAin of the interface unit for receiving the packets of the network-processor accelerator, the number of wires NPin of the interface unit for receiving the packets of the network processor, and the number of wires NPout of the interface unit for sending the packets of the network processor.

12. The network apparatus according to claim 1, wherein the relationship of NPin=NPout is established between the number of wires NPin of the interface unit for receiving the packets of the network processor and the number of wires NPout of the interface unit for sending the packets of the network processor.

13. The network apparatus according to claim 1, wherein the relationship of NPin+NPout=NAin is established among the number of wires NAin of the interface unit for receiving the packets of the network-processor accelerator, the number of wires NPin of the interface unit for receiving the packets of the network processor, and the number of wires NPout of the interface unit for sending the packets of the network processor.

14. The network apparatus according to claim 1, wherein the relationship of BWPin<BWAin is established between the bandwidth BWAin of the interface unit for receiving the packets of the network-processor accelerator and the bandwidth BWPin of the interface unit for receiving the packets of the network processor.

15. The network apparatus according to claim 1, wherein the relationship of BWPin=BWPout is established between the bandwidth BWPin of the interface unit for receiving the packets of the network processor and the bandwidth BWPout of the interface unit for sending the network processor.

16. A network apparatus comprising:
a network interface for transmitting or receiving packets to a network;
a first processor for transferring the received packets to a next transfer destination;
a table memory for storing a table referred for the transfer process; and
a second processor for transferring the received packets,
wherein the second processor transfers the received packets having the destination addresses which are identical to that of the received packets already processed with the first processor, and
the second processor comprises:
an interface unit for temporarily storing the received packet;
a packet analysis unit for obtaining the extracted information by extracting the necessary domain from the received packets;
a cache memory for storing the process result required for transfer process of the received packets;
an address generation means for referring to the cache memory from the extracted information;
a means for determining whether the relevant information exists or not in the cache memory as the result of reference to the cache memory from the extracted information;
a means for reassembling the packets from the relevant information when the relevant information exists in the cache memory;
a primary table for management of the packets as cache miss packets when the relevant information does not exist in the cache memory;
a secondary table for management of the second and subsequent packets that are containing the relevant information not existing in the cache memory and are expected to provide the process result which is identical to that of the packets recorded in the primary table;
an interface unit for transmitting the packets and necessary information to the first processor for implementing, with a programmable manner, the processes of cache miss packet recorded to the primary table;
an interface unit for receiving the processed packets and added information from the first processor;
a means for recording the process result information of the processed packets to the cache memory;
a means for applying the process result to the relevant packets recorded to the secondary table;
a means for releasing the entries of the primary and secondary tables having completed the processes;
a means for generating the transmitting packets from the processed packets or the process result information; and
an interface unit for transmitting the processed packets.

17. A network-processor accelerator, comprising:
an input interface unit for receiving packets;
a packet memory for temporarily storing the received packets;
a packet analysis unit for obtaining the extracted information by extracting the necessary domain from the received packets;
a cache memory for storing result of processes required for the transfer process of the received packets;
a means for determining whether the result of process to be applied to the received packets exists or not by referring to the cache memory;
an output interface for transmitting the packets;
a means for processing a cache miss, that is generated if the result of process conducted for the received packets does not exist in the cache memory, when the cache miss is generated; and
a network processor interface for connection to a network processor, wherein the means for processing cache miss comprising: integrated processors for transferring the cache miss; and an interface for referring to a routing table required by the integrated processors for the transfer process.

18. The network-processor accelerator according to claim 17,
wherein the means for processing cache miss comprising:
integrated processors for transferring the cache miss; and
an interface for referring to a routing table required by the integrated processors for the transfer process.

19. The network-processor accelerator according to claim 18,
wherein if the integrated processors cannot perform the transfer process of the received packets, the received packets are transferred to the interface.

20. The network-processor accelerator according to claim 18, comprising the integrated network processor.

21. The network-processor accelerator according to claim 17, comprising in common a means for processing the cache miss in order to independently provide other packet analysis means, cache-related means, transmitting packet generation means for both input and output sides.

22. A network-processor accelerator, comprising:
an interface unit for temporarily storing the received packets;
a packet analysis unit for obtaining the extracted information by extracting the necessary domain from the received packets;
a cache memory for storing the process result required for transfer process of the received packets;
an address generation means for referring to the cache memory from the extracted information;
a means for determining whether the relevant information exists or not in the cache memory as the result of reference to the cache memory from the extracted information;
a means for reassembling the packets from the relevant information when the relevant information exists in the cache memory;
a primary table for management of the packets as cache miss packets when the relevant information does not exist in the cache memory;
a secondary table for management of the second and subsequent packets that are containing the relevant information not existing in the cache memory and are expected to provide the process result which is identical to that of the packets recorded in the primary table;
an interface unit for transmitting the packets and necessary information to an external connected network processor for implementing, with a programmable manner, the processes of cache miss packet recorded to the primary table;
an interface unit for receiving the processed packets and added information from the external connected network processor;
a means for recording the process result information of the processed packets to the cache memory;
a means for applying the process result to the relevant packets recorded to the secondary table;
a means for releasing the entries of the primary and secondary tables having completed the processes;
a means for generating the transmitting packets from the processed packets or the process result information; and
an interface unit for transmitting the processed packets.

23. The network-processor accelerator according to claim 22,
wherein the secondary tables are prepared in the number equal to the number of entries of the primary table and the number of entries of the respective secondary tables is all set to the constant value.

24. The network-processor accelerator according to claim 22,
wherein the secondary table is placed under the management of a linked-list style.

25. The network-processor accelerator according to claim 22,
wherein the secondary table is placed under the management by utilizing the CAM or fully associative memory.

* * * * *